(12) United States Patent
Quinn et al.

(10) Patent No.: US 9,290,317 B2
(45) Date of Patent: Mar. 22, 2016

(54) METHOD FOR BREWING BEVERAGE AND CARTRIDGE CONTAINING INFUSIBLE MATERIAL

(75) Inventors: Anthony Edward Quinn, Sharnbrock (GB); Osvaldo Maffei, Sharnbrock (GB); Robert Wim Bronwasser, Amsterdam (NL); Raffaele Zandona, Vicenza (IT)

(73) Assignee: Conopco, Inc., Englewood Cliffs, NJ (US)

( * ) Notice: Subject to any disclaimer, the term of this patent is extended or adjusted under 35 U.S.C. 154(b) by 620 days.

(21) Appl. No.: 13/704,998

(22) PCT Filed: Jun. 23, 2011

(86) PCT No.: PCT/EP2011/060538
§ 371 (c)(1),
(2), (4) Date: Mar. 4, 2013

(87) PCT Pub. No.: WO2012/007257
PCT Pub. Date: Jan. 19, 2012

(65) Prior Publication Data
US 2013/0156899 A1    Jun. 20, 2013

(30) Foreign Application Priority Data
Jul. 14, 2010    (EP) .................................... 10169485

(51) Int. Cl.
*B65D 85/804* (2006.01)
*A47J 31/40* (2006.01)
*A23F 3/18* (2006.01)

(52) U.S. Cl.
CPC .............. *B65D 85/8043* (2013.01); *A23F 3/18* (2013.01); *A47J 31/407* (2013.01)

(58) Field of Classification Search
CPC .................................................. B65D 85/8043
See application file for complete search history.

(56) References Cited

U.S. PATENT DOCUMENTS

| 2,660,948 | A | | 12/1953 | Forschner et al. |
| 3,385,569 | A | | 5/1968 | Bookout |
| 3,446,399 | A | | 5/1969 | Ross et al. |
| 3,764,017 | A | * | 10/1973 | Dover ................ B65D 85/8043 210/481 |

(Continued)

FOREIGN PATENT DOCUMENTS

| CN | 1640350 | 7/2005 |
| CN | 101600378 | 2/2009 |

(Continued)

OTHER PUBLICATIONS

PCT Written Opinion PCT/EP2011/060538 dated Jul. 26, 2011.

(Continued)

*Primary Examiner* — Erik Kashnikow
*Assistant Examiner* — Chaim Smith
(74) *Attorney, Agent, or Firm* — Foley & Lardner LLP

(57) ABSTRACT

The present invention provides a method for brewing a beverage in a brewing apparatus, wherein a cartridge containing infusible material is connected to a brew chamber and will form the bottom of the brew chamber. By the introduction of air through the filter of the cartridge, water and infusible material are mixed, and an effective brewing process is conducted. After brewing the beverage is discharged into a receptacle through the filter of the cartridge, leaving infusible material behind in the cartridge. The invention also provides a cartridge for use in the method.

7 Claims, 5 Drawing Sheets

(56) References Cited

U.S. PATENT DOCUMENTS

| | | | |
|---|---|---|---|
| 3,823,656 A | 7/1974 | Vander Veken | |
| 3,971,305 A | 7/1976 | Daswick | |
| 4,069,751 A * | 1/1978 | Gronwick | A47J 31/02 99/306 |
| 4,174,659 A * | 11/1979 | Pugliese | A47J 31/02 99/306 |
| 4,410,550 A | 10/1983 | Gaskill | |
| 2,827,845 A | 3/1985 | Richeson | |
| 4,520,716 A * | 6/1985 | Hayes | A47J 31/02 99/295 |
| 4,644,855 A | 2/1987 | Woolman et al. | |
| 4,826,695 A | 5/1989 | Tanner | |
| 4,867,993 A * | 9/1989 | Nordskog | B65D 85/8043 426/110 |
| 4,882,983 A | 11/1989 | Pastrick | |
| 4,898,090 A | 2/1990 | Chan | |
| 4,920,871 A | 5/1990 | Anson et al. | |
| 4,967,647 A | 11/1990 | King et al. | |
| 4,984,511 A | 1/1991 | Sekiguchi | |
| 5,010,221 A * | 4/1991 | Grossman | A47J 36/027 219/689 |
| 5,259,298 A | 11/1993 | King | |
| 5,349,897 A | 9/1994 | King et al. | |
| 5,393,540 A | 2/1995 | Bunn et al. | |
| 5,406,882 A | 4/1995 | Shaanan | |
| 5,460,078 A | 10/1995 | Weller et al. | |
| 5,479,849 A | 1/1996 | King et al. | |
| 5,623,864 A | 4/1997 | Moore et al. | |
| 5,636,563 A | 6/1997 | Oppermann et al. | |
| 5,896,805 A | 4/1999 | Katou et al. | |
| 5,913,963 A | 6/1999 | King | |
| 5,947,004 A | 9/1999 | Huang | |
| 6,142,063 A | 11/2000 | Beaulieu et al. | |
| 6,705,471 B2 * | 3/2004 | Kataoka | A47J 31/02 210/473 |
| 6,887,506 B2 | 5/2005 | Kalenian et al. | |
| 7,226,631 B2 | 6/2007 | Thakur et al. | |
| 7,351,576 B1 | 4/2008 | Harmon et al. | |
| 7,922,382 B2 | 4/2011 | Thakur et al. | |
| 2001/0043954 A1 | 11/2001 | Sweet | |
| 2002/0152895 A1 | 10/2002 | Duffy et al. | |
| 2003/0213369 A1 | 11/2003 | Hall et al. | |
| 2003/0233946 A1 | 12/2003 | Cirigliano et al. | |
| 2004/0065209 A1 | 4/2004 | Piazza | |
| 2004/0118290 A1 | 6/2004 | Cai | |
| 2005/0126401 A1 | 6/2005 | Streeter et al. | |
| 2005/0150390 A1 | 7/2005 | Schifferle | |
| 2006/0174773 A1 | 8/2006 | Taylor et al. | |
| 2006/0230946 A1 | 10/2006 | Cheng et al. | |
| 2007/0034083 A1 | 2/2007 | Van Hattem et al. | |
| 2007/0186780 A1 | 8/2007 | Clark | |
| 2008/0026121 A1 | 1/2008 | Mastropasqua et al. | |
| 2008/0050480 A1 | 2/2008 | Doglioni Majer et al. | |
| 2008/0072766 A1 | 3/2008 | Kobylarz | |
| 2008/0095903 A1 | 4/2008 | Weijers | |
| 2008/0166463 A1 | 7/2008 | Green et al. | |
| 2008/0206418 A1 | 8/2008 | Ranzoni | |
| 2008/0210098 A1 | 9/2008 | Weijers et al. | |
| 2008/0302250 A1 | 12/2008 | Duineveld et al. | |
| 2008/0302252 A1 | 12/2008 | O'Brien et al. | |
| 2009/0101022 A1 | 4/2009 | Levin | |
| 2010/0173057 A1 | 7/2010 | Gugerli et al. | |

FOREIGN PATENT DOCUMENTS

| | | |
|---|---|---|
| CN | 101600378 | 12/2009 |
| DE | 102007028674 | 8/2008 |
| EP | 0249700 | 12/1987 |
| EP | 0272922 | 6/1988 |
| EP | 0296478 | 12/1988 |
| EP | 0449533 | 10/1991 |
| EP | 0483244 | 5/1992 |
| EP | 0613646 | 9/1994 |
| EP | 0638486 | 2/1995 |
| EP | 0808598 | 5/1997 |
| EP | 0812557 | 12/1997 |
| EP | 0812558 | 12/1997 |
| EP | 1010385 | 6/2000 |
| EP | 1365657 | 12/2003 |
| EP | 1440913 | 6/2006 |
| EP | 1795093 | 6/2007 |
| EP | 1767467 | 4/2009 |
| EP | 1986934 | 11/2011 |
| GB | 1040095 A | 8/1966 |
| GB | 1164760 | 9/1969 |
| GB | 1316686 | 5/1973 |
| GB | 2217976 | 11/1989 |
| JP | 6314375 | 11/1994 |
| JP | 2001275842 | 10/2001 |
| JP | 2007004264 | 1/2007 |
| JP | 2007004264 A | 1/2007 |
| WO | WO8605670 | 10/1986 |
| WO | WO8802612 A1 | 4/1988 |
| WO | WO9101673 | 2/1991 |
| WO | WO9826698 | 6/1998 |
| WO | WO0028867 | 5/2000 |
| WO | WO0158786 | 8/2001 |
| WO | WO0243540 A1 | 6/2002 |
| WO | WO03073896 | 9/2003 |
| WO | WO03082065 A1 | 10/2003 |
| WO | WO2005004682 | 1/2005 |
| WO | WO2006066626 | 6/2006 |
| WO | WO2006137737 | 12/2006 |
| WO | WO2007042485 A1 | 4/2007 |
| WO | WO2009081427 | 7/2009 |
| WO | WO2009135177 A1 | 11/2009 |
| WO | WO2010059251 A1 | 5/2010 |

OTHER PUBLICATIONS

PCT International Search Report PCT/EP2011/060538 dated Jul. 26, 2011.
EP Search Report F8095(V) dated Dec. 8, 2010.
Co-Pending U.S. Appl. No. 13/704,999, filed Feb. 5, 2013; entitled: Beverage Brewing Apparatus and Method.
IPRP2 in PCTEP2011060539, Jun. 27, 2012.
Search Report in CN201180032483 Translation, Aug. 22, 2014.
Search Report in EP10169487, Dec. 3, 2010.
Search Report in PCTEP2011060539, Jul. 28, 2011.
Written Opinion in PCTEP2011060539, Jul. 28, 2011.

* cited by examiner

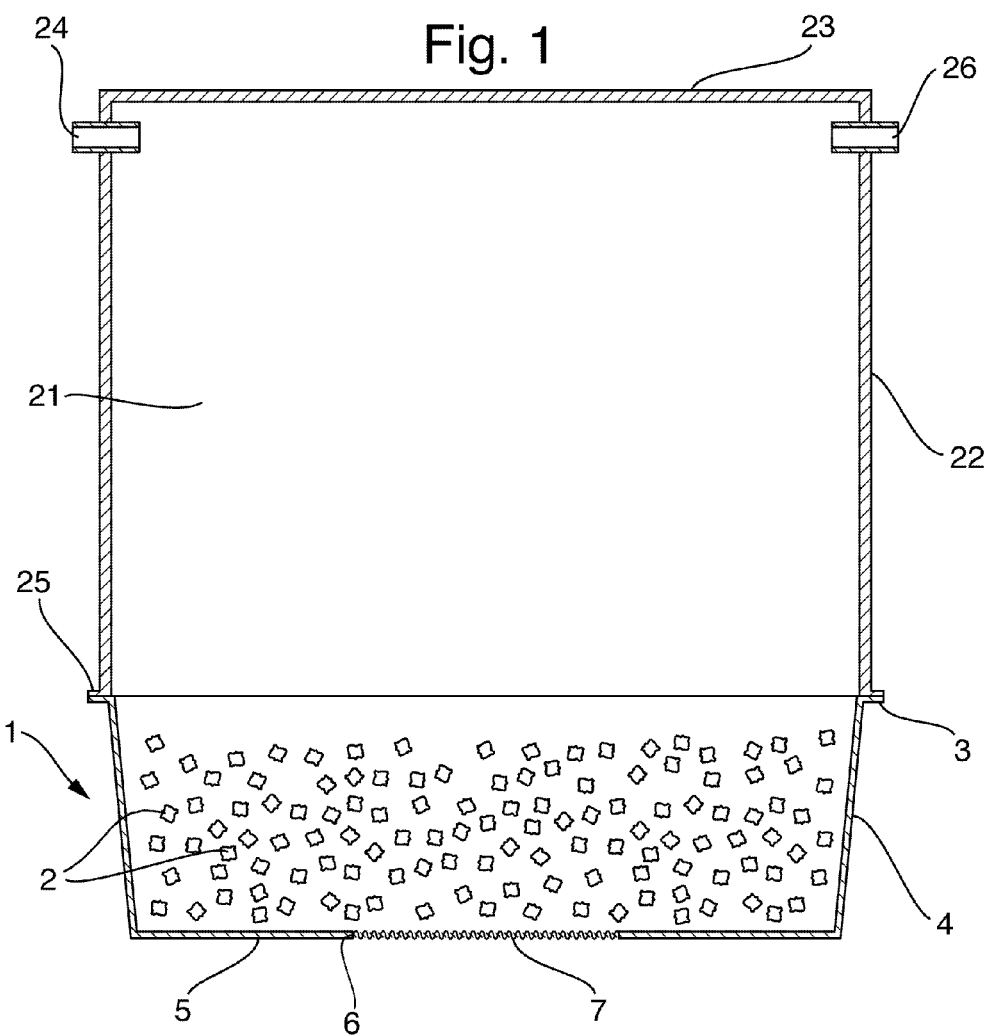
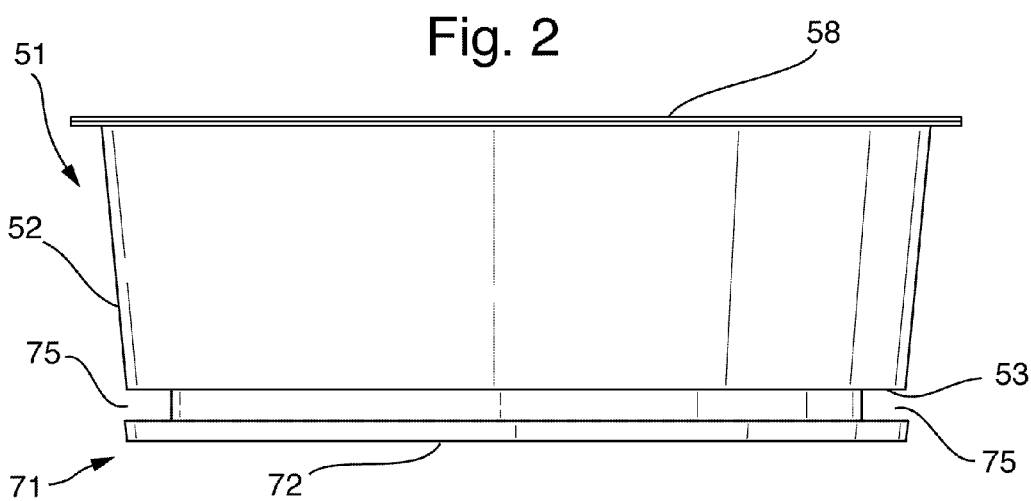

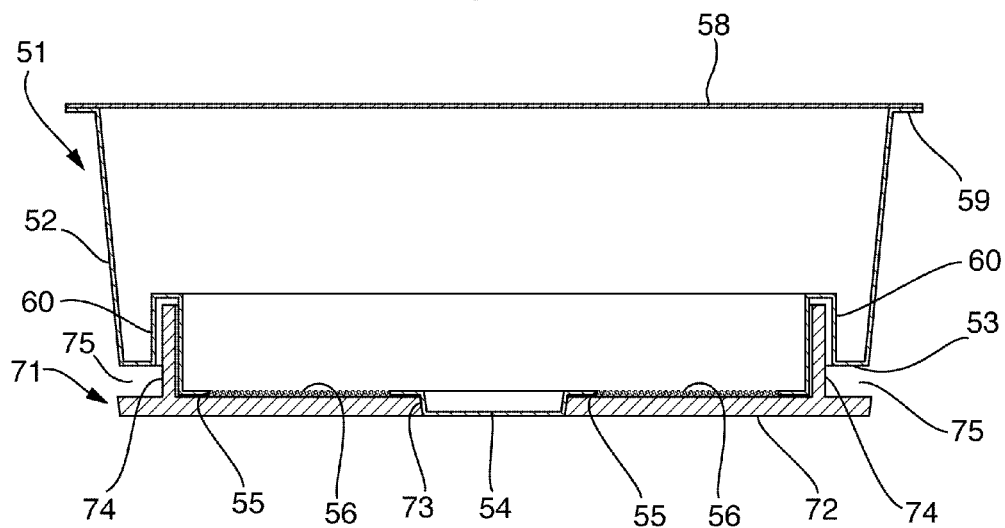
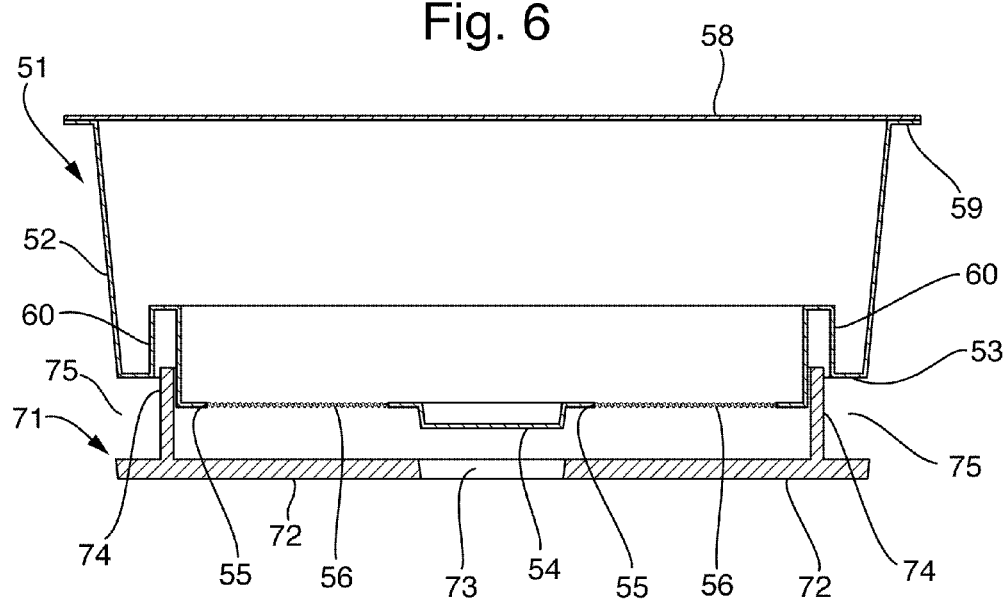

METHOD FOR BREWING BEVERAGE AND CARTRIDGE CONTAINING INFUSIBLE MATERIAL

The present invention relates to a method for brewing a beverage in a brew chamber having a removable cartridge containing an infusible ingredient. Moreover, the present invention relates to a cartridge for preparation of a beverage. The invention also relates to an apparatus suitable for preparation of a beverage using the cartridge of this invention.

BACKGROUND OF THE INVENTION

With the exception of water, tea is the most widely consumed of all beverages. Its world-wide per capita consumption has been estimated at 0.1 liter per day. Furthermore, other brewed beverages such as fruit infusions, iced tea and coffee are increasingly consumed world-wide. In western countries, brewed beverages tend to be prepared at home, however, there is a growing trend for consumers to consume such beverages out of the home in, for example, cafes and bars. The teabag is a widely used solution to offer hot tea in these environments—the long brewing time and mess after brewing are barriers to consume hot tea out of home. Therefore an alternative brewing method is required, especially for the out of home market.

Brewing devices for making coffee, tea, chocolate or any other beverage are known in the art.

WO 2007/042485 A1 discloses a device for brewing a beverage, containing an infusion container and a cartridge that contains infusible matter. The cartridge is connectable to the infusion container. An openable and closable passage is located underneath the cartridge, which forms a hermetic connection between the infusion container, and the passage.

WO 88/02612 describes a brewing device that contains an infusion chamber with a movable base, and the base is provided with a filter. The device is provided with an air pump that can draw air upwardly through the filter into the chamber during infusion, or can be used to pressurize the infusion chamber for discharging the infused liquid through the filter.

WO 02/43540 A1 discloses a tea brewing machine that has a housing, a vessel for receiving leaf tea, hot water supply means for supplying hot water to the vessel, means for physically agitating the leaf tea within the vessel to maximise the rate and extent of infusion, and a siphon arrangement for siphoning the infusion out of the vessel before it is dispensed. In one embodiment hot water is pumped into the brewing vessel as water jets.

US 2007/0034083 A1 discloses a brewing device for the preparation of beverages such as coffee, tea, roasted-barley coffee, camomile tea and similar brews and infusions. In one embodiment, hot water contained in a hopper flows down through a valve to produce a kind of Umbrellas effect to urge the down-flowing water against the walls of the brew chamber, thereby cleaning them from the brewing residues.

GB 2 217 976 A discloses an apparatus for brewing a beverage, wherein an infusible ingredient is introduced in a container having a filter base. A piston pushes air through the filter to agitate the ingredient and water, and after brewing pulls out the brewed liquid while the infusible ingredient is retained on the filter.

Also cartridges or containers containing infusible materials are known in the art. They usually provide a convenient, rapid and consumer friendly way of brewing a beverage such as coffee or tea. The cartridges or containers are usually designed for single use, and are disposed of after brewing a beverage. Generally the cartridges are used in combination with a brewing device which is especially suited for the specific cartridges. A good example of popular cartridges containing coffee are the Nespresso coffee cartridges. Usually the cartridge or container functions as a brew chamber as well as a filter: solids remain in the cartridge, they are not released from the cartridge.

EP 808 598 A1 discloses a cartridge containing ground coffee, which can be connected to the bottom of a holder; the holder is filled with hot water, and coffee is brewed by the dripping of water through the cartridge. The ground coffee is retained in the cartridge.

EP 1 440 913 A1 discloses a cartridge containing a beverage ingredient in a storage chamber. An aqueous medium can flow into the cartridge, be brought into contact with the beverage ingredient, and flows out of the cartridge through holes in a pierceable lid. The beverage ingredient may be soluble or insoluble, and may be used for the making of a cup of coffee, tea, chocolate, or a dairy-based beverage.

WO 03/073896 A1 discloses a sealed container for extracting water-soluble contents, especially for brewing coffee. To brew the beverage an orifice is inserted through the cover to inject hot water and vapour into the container. The body of the container provides both filtering function of the contents and discharging function of the extracted liquid.

WO 2009/081427 A1 discloses a filter used in equipment for the preparation of a hot beverage. A container is connected to a boiler, wherein water is heated. In between these two elements a filter unit containing ground coffee is located. Water from the boiler is forced upward through the filter into the upper container where the beverage is introduced, and wherein the filter unit keeps the ground coffee inside the filter unit.

The present systems have a few disadvantages which will be addressed by the present invention. Existing systems typically consist of a cylindrical shaped brew chamber where product is introduced at one end (the top) and the leaf residue is removed from the other (the bottom). Often the bottom of the brew chamber consists of a sieve or filter that is cleaned after brewing. The use of such systems to brew multiple varieties eg black tea, flavoured teas, and herbal infusions sequentially through the same brewer may result in carryover of flavours from one brew to the next. Also product can get stuck above the water level when leaf is introduced from top, leading to waste of leaf and flavour carryover.

Alternatively, systems exist that brew a beverage in a disposable package. As the liquor is brewed in the package and the package with leaf is disposed afterwards, carryover of flavours is minimised. As the packages are smaller than the final cup volume the water must flow through the package—the leaf to water ratio is limited as is the contact time between leaf and water. As a result only very fine cut leaf can be used.

Thirdly, existing systems typically have a significant length of tubing between the filter, and the point at which the infused liquor is dispensed. This carries a large internal surface area, and due to it's construction (eg U-tubes, and other non drainable areas) may be difficult to rinse effectively between brews.

Finally existing devices may contain one or more valves or other mechanical elements that come into contact with the brewed beverage. As each mechanical, movable element in a device eventually gets worn and may get broken, it is disadvantageous if a device contains such movable elements. Moreover such elements when coming into contact with brewed beverage, still may contain traces of the brewed beverage or deposits from the beverage, which are difficult to remove, even after rinsing. Such deposits may lead to carry over of flavour from one brew to the other, as when a second brew is released from a brew chamber into a cup, (parts of) deposits from a first brew attached to the moving parts, may be rinsed with the second brew into the cup. This is a disadvantage, as the consumer will not be served with a perfect beverage which is free from flavours from previous brews.

Hence it is an objective of the present invention to provide a method for brewing a beverage which overcomes the disadvantages of the prior art as indicated above, as well as cartridge which can be used in that method, and that contains an infusible material to brew a beverage.

The present invention takes away these disadvantages by providing a method for brewing a beverage using a brewing machine, which is equipped with a brew chamber which is open at the bottom. The brew chamber can be closed at the bottom by a removable cartridge which contains an infusible material to brew a beverage. The cartridge is introduced to the brew chamber by connecting the cartridge to the brew chamber. The cartridge contains an opening in the bottom part which comprises a filter. This cartridge serves as the bottom of the brew chamber during the brewing process. Gas which is introduced through the opening of the cartridge into the brew chamber leads to agitation of the infusible material in water, leading to an effective brewing process. After termination of the brewing process, the brewed beverage is discharged through the opening and the infusible material is retained on the filter. The cartridge can be removed from the brew chamber after this process.

As an additional advantage the brewing device does not contain movable valves and other movable equipment parts which come into contact with the brewed beverage and which may break during use over time. Moreover the need for a mechanical valve, or U-tube, siphon, positioned after the filter has been eliminated. Also a funnel to empty the brew chamber to fill a cup or a jug or can is not required, as the beverage can be dispensed directly through the filter of the cartridge. Additionally less equipment parts need to be cleaned between brews, which is advantageous because of less time requirement for cleaning, and because of reduced flavour carry over between brews of different taste and flavour.

Other advantages of the method according to the invention are that all infusible material is introduced and mixed with water. Moreover all infusible material is removed after brewing from the brew chamber. As the sieve is integrated in the cartridge, flavour carry over between various brews is limited. The cartridge forms an integrated and integral part of the brew chamber. No additional means of cleaning are needed than rinsing.

With reference to non-limiting FIG. 1, in a first aspect the present invention provides a method for brewing a beverage in a brewing apparatus, wherein the apparatus comprises a brew chamber 21 that comprises a side wall 22, a bottom rim 25, a top wall 23, and an opening 24, comprising the steps:

a) connecting the top rim 3 of a cartridge 1 containing an infusible particulate ingredient 2 to the bottom rim 25 of the brew chamber, such that a water-tight connection is made; wherein the cartridge 1 comprises a side wall 4 and a bottom wall 5
and is made from a water-impermeable material,
and wherein the bottom wall contains an opening 6 and a filter 7;

b) drawing gas out of the brew chamber through opening 24 and simultaneously drawing gas into the brew chamber through opening 6 and filter 7 of the container;

c) at least partly simultaneously with step b) filling the brew chamber with water through inlet 26 and brewing the beverage by mixing water and infusible particulate material 2 in the brew chamber 21; and d) terminating drawing of gas out of the brew chamber and discharging the brewed beverage through opening 6 and filter 7.

With reference to non-limiting FIGS. 2 to 11, in a second aspect the present invention provides a cartridge for connecting to a brew chamber for brewing a beverage, comprising a first element 51 and a second element 71,
wherein the first element 51 comprises a side wall 52 and a bottom wall 53,
wherein the side wall 52 and bottom wall 53 are made from a water-impermeable material,
wherein the bottom wall 53 contains a protuberance 54 that directs to the outside of the first element 51,
wherein the bottom wall contains an opening 55,
wherein the opening comprises a filter 56 which is permeable to water,
wherein the top is optionally closable by a seal 58 and which is attachable to the upper rim 59 of the side wall 52,
and wherein the bottom wall 53 comprises one or more notches 60 directed to the inside of the first element 51,
and wherein the second element 71 comprises a bottom wall 72,
wherein the bottom wall 72 is made from a water-impermeable material,
wherein the bottom wall 72 comprises an opening 73 which is able to interlock with protuberance 54 in order to create a water-tight connection,
wherein the bottom wall 72 contains one or more protuberances 74 which are able to interlock with the corresponding one or more notches 60,
and wherein the second element 71 is moveable relative to the first element 51 about the corresponding notch 60 and protuberance 74.

With reference to non-limiting FIGS. 2 to 11, in a preferred embodiment of the first aspect of the invention, the present invention also provides a method for brewing a beverage in a brewing apparatus using a cartridge according to the first aspect of the invention, wherein the apparatus comprises a brew chamber 21 that comprises a side wall 22, a bottom rim 25, a top wall 23, and an opening 24, and means to connect a cartridge to the brew chamber,
comprising the steps:

a) optionally releasing seal 58 from the cartridge,
wherein the protuberance 54 of the first element 51 is interconnected with the opening 73 of the second element 71 to close the bottom wall 53 of the first element 51;

b) putting the cartridge into the brewing machine and connecting the top rim 59 of the first element of the cartridge to the bottom rim 25 of the brew chamber, such that a water-tight connection is made;

c) optionally prior to or simultaneous with step b), moving the second element 71 of the cartridge relative to the first element 51 of the cartridge, such that the filter 56 is exposed to the atmosphere;

d) drawing gas out of the brew chamber through opening 24 or through optional opening 26, and simultaneously drawing gas into the brew chamber through opening 55 and filter 56 of the cartridge;

e) at leastly partly simultaneous with step d), filling the brew chamber 21 with water, and brewing the beverage by mixing water and infusible particulate material in the brew chamber 21; and f) terminating drawing of gas out of the brew chamber and discharging the brewed beverage through opening 55.

With reference to non-limiting FIGS. 2 to 11, in a third aspect the present invention provides an apparatus for brewing a beverage using a cartridge according to the second aspect of the invention, containing a brew chamber and means to connect a cartridge to the brew chamber such that a watertight connection is formed, and
means to move the second element 71 of the cartridge relative to the first element 51 of the cartridge about the corresponding notch 60 and protuberance 74,
wherein said means comprise a holder which fits in a gap 75 between the first element 51 and the second element 71, and wherein the holder can move relative to the first element 51 to increase the width of the gap 75 between the first element 51 and the second element 71.

With reference to non-limiting FIGS. 2 to 11, in a fourth aspect the present invention provides a method for opening a cartridge according to the second aspect of the invention, wherein the protuberance 54 of the first element 51 of the cartridge is interconnected with the opening 73 of the second element 71 to close the bottom wall 53 of the first element 51, wherein the second element 71 is moved from the first element 51 about the corresponding notch 60 and protuberance 74, to expose the filter 56 to the atmosphere.

DESCRIPTION OF FIGURES

The following figures are illustrative of the present invention, and are not considered to be limiting the present invention.

FIG. 1: Schematic drawing of the brew chamber and cartridge used in the method according to the first aspect of the invention.

FIG. 2: Side view of a preferred cartridge according to the second aspect of the invention.

FIG. 5: Side view of a preferred cartridge according to the second aspect of the invention, section at the line A-A' as indicated in FIG. 3. Closed position, such that protuberance (54) closes opening (73).

FIG. 6: Side view of a preferred cartridge according to the second aspect of the invention, section at the line A-A' as indicated in FIG. 3. Opened position, such that protuberance (54) does not close opening (73).

DEFINITIONS

Figure 3:
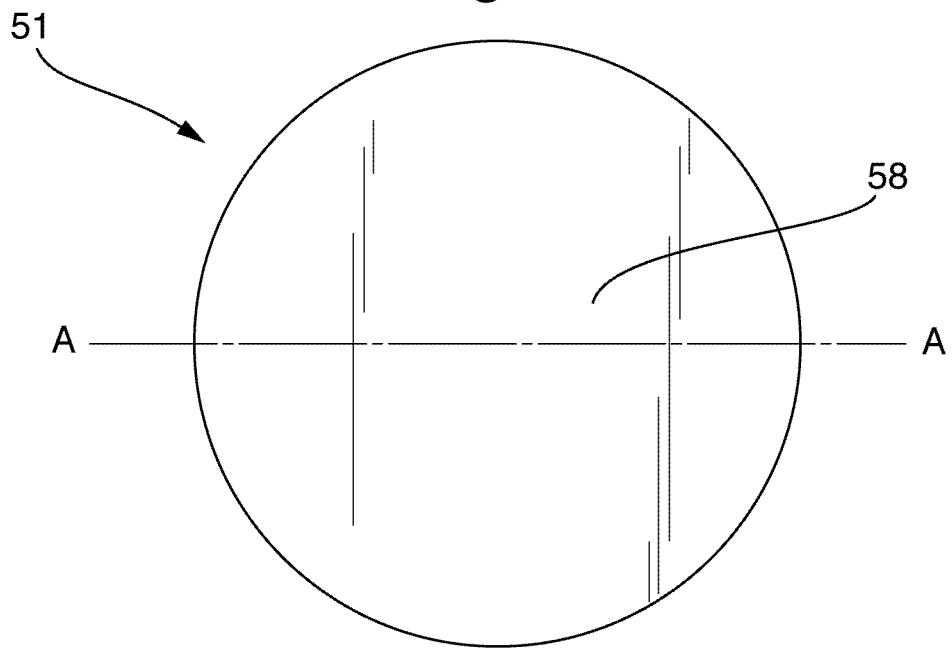
FIG. 3: Top view of a preferred cartridge according to the second aspect of the invention.

Unless defined otherwise, all technical and scientific terms used herein have the same meaning as commonly understood by one of ordinary skill in the art. All percentages, unless otherwise stated, refer to the percentage by weight.

Any numerical ranges indicated in here include the respective endpoints, unless stated otherwise. Gas flow rates indicated herein are determined under normal conditions (at a pressure of 1 atmosphere=101,325 Pa). All numbers in this description indicating amounts or temperatures of material may optionally be understood as modified by the word 'about'.

Beverage: As used herein the term 'beverage' refers to a substantially aqueous drinkable composition suitable for human consumption. Preferably the beverage comprises at least 85% water by weight of the beverage, more preferably at least 90% and most preferably from 95 to 99.9° A.

Infusible material: As used herein the term 'infusible material' refers to substances that when mixed with aqueous liquid release certain substances into the liquid thereby to form a beverage.

Brewing: As used herein, the term 'brewing' refers to the addition of a liquid to an infusible material thereby to form a beverage. Brewing may be carried out at any temperature.

Brew liquor: As used herein the term 'brew liquor' refers to the beverage formed from the result of the brewing process whereby certain substances are released from the infusible material into the liquid thereby to form the brew liquor.

Agitation: As used herein, the term 'agitation' refers to the process whereby an infusible material and liquid are mixed. Agitation may be realised by mechanical means (eg by stirring), or by the action of water (herein referred to as 'water agitation'), or by the action of air (herein referred to as 'air agitation').

Rinsing: As used herein, the term 'rinsing' refers to the removal of infusible materials or brew liquor residue from any apparatus associated with the brewing process, in particular a brew chamber.

Tea: As used herein the term 'tea' refers to leaf material from *Camellia sinensis* var. *sinensis* or *Camellia sinensis* var. *assamica*. It also includes rooibos obtained from *Aspalathus linearis*. 'Tea' is also intended to include the product of blending two or more of any of these teas. The leaf material may be substantially fermented i.e. black tea, semi-fermented i.e. oolong tea, or substantially unfermented i.e. green tea. The tea could be a flavoured and/or spiced tea.

Leaf tea: As used herein the term 'leaf tea' refers to a tea product that contains one or more tea origins in a substantially un-infused form.

Tea-based beverage: As used herein, the term 'tea-based beverage' refers to a beverage comprising at least 0.01% by weight tea solids. Preferably the tea-based beverage comprises from 0.04 to 3%, more preferably from 0.06 to 2%, most preferably from 0.1 to 1% by weight tea solids.

Tangential: As used herein, the term 'tangential' has the same meaning as would be understood by the person skilled in the art i.e. it refers to a line that may be drawn on a curve at any given point that is a straight line touching the curve at that point. In the simplest example of a curve, i.e. a circle, any straight line touching the curve at a 90 degree angle to the radius is "tangential". The term 'substantially tangential' refers to a straight line touching a curve that is within 15 degrees of a line that is tangential to the curve, preferably within 10 degrees, most preferably within 5 degrees.

Infusible Material Particle Size and Grade:

For the purposes of the present invention, infusible material particle size is characterised by sieve mesh size using the following convention: Tyler mesh sizes are used throughout; A "+" before the sieve mesh indicates the particles are retained by the sieve; A "−" before the sieve mesh indicates the particles pass through the sieve. For example, if the particle size is described as −5 +20 mesh, then the particles will pass through a 5 mesh sieve (particles smaller than about 4.0 millimeter) and be retained by a 20 mesh sieve (particles larger than about 841 micrometer).

Leaf particle size may additionally or alternatively be characterized using the grades listed in the international standard ISO 6078-1982. These grades are discussed in detail in our European patent specification EP 1 365 657 B1 (especially paragraph [0041] and Table 2) which is hereby incorporated by reference.

DETAILED DESCRIPTION

Method for Brewing Beverage

With reference to non-limiting FIG. 1, in a first aspect the present invention provides a method for brewing a beverage in a brewing apparatus, wherein the apparatus comprises a brew chamber 21 that comprises a side wall 22, a bottom rim 25, a top wall 23, and an opening 24, comprising the steps:
a) connecting the top rim 3 of a cartridge 1 containing an infusible particulate ingredient 2 to the bottom rim 25 of the brew chamber,
such that a water-tight connection is made;
wherein the cartridge 1 comprises a side wall 4 and a bottom wall 5
and is made from a water-impermeable material,
and wherein the bottom wall contains an opening 6 and a filter 7;
b) drawing gas out of the brew chamber through opening 24 and simultaneously drawing gas into the brew chamber through opening 6 and filter 7 of the container;
c) at least partly simultaneously with step b) filling the brew chamber with water through inlet 26 and brewing the beverage by mixing water and infusible particulate material 2 in the brew chamber 21; and
d) terminating drawing of gas out of the brew chamber and discharging the brewed beverage through opening 6 and filter 7.

With reference to non-limiting FIG. 1, the brew chamber 21 comprises a side wall 22 which may be positioned substantially vertical, although deviations from the vertical position are within the scope of the invention. The side walls 22 may be straight or curved, or may take any shape suitable for a brew chamber and which is attractive for the consumer or operator. Brew chamber 21 can have any suitable shape, preferably it has a cylindrical shape with a circular top. The top wall 23 can be affixed to the side wall 21 or it can be a loose top cover connectable to the side wall 22 and covering the brew chamber. The top wall may be a lid which is connectable to the top rim of wall 21. The brew chamber 21 has no bottom wall: the cartridge 1 comprising infusible material 2 can be connected to the brew chamber 21 and therewith can become an integral part of the brew chamber in the method according to the invention. The cartridge is removable from the brew chamber.

In the context of the present invention, 'connecting a cartridge to a brew chamber', or a 'connection between the cartridge and the brew chamber' should be understood to have its widest possible meaning. Connecting can have the meaning that a cartridge is linked with the brew chamber, for example by using a clamp to tightly secure the cartridge to the brew chamber to create a leak-free seal between the cartridge and the brew chamber, or any other mechanical device. Connecting can also have the meaning that a cartridge is linked with the brew chamber by pressing the top edge of the cartridge against the lower edge of the brew chamber, by exerting force on the cartridge to create a leak-free seal between the cartridge and the brew chamber.

The brewing apparatus suitable for executing the method according to the first aspect of the invention preferably also comprises a gas pump and connecting means between the opening 24 and the gas pump. The opening 24 may be located in the side wall 22 of the brew chamber, or alternatively in the lid or top 23 of the brew chamber. Preferably the opening 24 is located above the normal beverage level in the brew chamber, such that no liquid is sucked out when gas is drawn out from the headspace. The connecting means between the opening 24 and the gas pump may include one or more pipes, valves, tubes, connectors, valves and other equipment which is known to the skilled person. Preferably, the gas pump is able to draw gas out of the brew chamber or blow gas into the brew chamber.

The brew chamber can be made from any material which is suitable to be used in the making of a brewed hot beverage. Preferably the brew chamber is made from glass or a plastic material or a metal. Preferably the brew chamber comprises a transparent side wall 22, such that the brewing process is visible to the operator or consumer. Hence the side wall of the brew chamber preferably comprises glass, perspex, pyrex, or other transparent heat resistant plastic. The material preferably does not deform when water is added to the brew chamber, in order to prevent leakage at the connection between brew chamber and cartridge. The volume of the brew chamber is not limited to a specific size. Preferably however, the volume is more or less the same as the volume a single cup of beverage, meaning about 150 to about 350 milliliter, preferably between 200 and 300 milliliter. The size of the brew chamber (including the volume of the cartridge) is chosen such that the chamber can also accommodate the gas bubbles which are created by the suction of gas through the opening 6 during the brewing process. Moreover the volume of the brew chamber is chosen such that the water does not flow out of the chamber through openings 24 and/or 26. The shape of the brew chamber preferably is cylinder shaped, with a circular cross-section, and a vertical wall 22. Alternatively the wall 22 may be conical, wherein the diameter at the top is larger than at the bottom, or vice versa. The brew chamber also may have a waist, or may be broader in the middle than at the top and bottom.

By the introduction of the cartridge to the brew chamber, the cartridge becomes an integral part of the brew chamber, and it will form the bottom section of the brew chamber. Hence the material from which the cartridge is made has properties which are suitable to be used in connection with a brewing process. For example, if the beverage to be brewed is tea, the cartridge should be able to withstand a temperature of at least 100° C., during a period of preferably at least 10 minutes, more preferably at least 5 minutes. This requirement limits the materials which are suitable to be used for making the cartridge. For example materials like plastics which have a softening or melting point below 100° C. are not suitable as cartridge material. Additionally, the material of the cartridge may be chosen such that it does not deform when water is added to the brew chamber, in order to prevent leakage at the connection between brew chamber and cartridge.

The top rim 3 of cartridge 1 can be attached to the bottom rim 25 of the brew chamber by any suitable closure means, as long as a water-tight connection is made. Examples of such closure means are a bajonet closure, or a screw-thread closure. Alternatively, the cartridge can be connected or disconnected to the brew chamber by means of a movement in a parallel or substantially parallel direction to the bottom rim of the brew chamber. In that case the bottom rim may contain one or more holders or grips in which the cartridge fits and which secures a water-tight connection between the top rim 3 of the cartridge and the bottom rim 25 of the brew chamber. The water-tight connection could be made using a flat silicone seal, an o-ring, or a seal built into the cartridge, or any other sealing method which is known to the skilled person and which functions to make a water-tight connection. Alternatively the connection can be made by firmly pressing the cartridge against the brew chamber, such that a leak-free seal is created between the cartridge and the brew chamber.

Preferably the cartridge has a disc shape. The cartridge is preferably a disposable package, yet can also be a re-usable element. The cartridge may be closed at the top side using a seal, for example made from aluminium foil or a layered aluminium/PE foil which is sealed to the top rim 3 of the cartridge 1. The seal may be a peel-off seal, preferably having a thickness of less than 100 micrometer. If the optional seal is an aluminium/PE foil, the aluminium layer is at the top and the PE layer is in contact with the flange of the cartridge. The sealing method could be heat sealing, ultrasonic sealing, or an adhesive could be used. Preferably the top rim 3 of the cartridge contains a flange which can be used to attach the optional top seal to the cartridge. Preferably the seal is removed from the cartridge by pulling a lip which is attached to the flange and easily can be broken off the flange, and to which lip part of the seal is attached, such that when pulling off the lip from the flange, the seal is also peeled off the cartridge simultaneously. Such a top rim 3 with an optional flange may also be functional in the attachment of the top rim 3 of the cartridge to the bottom rim 25 of the brew chamber. The brewing apparatus may be equipped with means to tighten the flange to the bottom rim of the brew chamber. These means may be for example a clamp or may be a press to force the cartridge against the brew chamber.

If the cartridge is closed by a seal, then prior to connecting the cartridge to the brew chamber, the seal is removed. This removal of the top seal may be done manually, for example by the machine operator. Alternatively, the apparatus may be designed such that the seal is removed by an appliance of the apparatus, before the top rim 3 of the cartridge 1 is connected to the bottom rim 25 of the brew chamber 21.

Also the bottom part of the cartridge may be sealed, such that filter 7 is covered and remains protected from exterior conditions prior to use. This optional seal may be made from the same materials as the optional top seal, and may be attached to the bottom part similarly as the attachment of the optional top seal. The optional seals keep the infusible material of the package fresh and also in the cartridge during transport and other operations. Such an optional seal should be removed before the cartridge is being used in the method according to the invention.

Alternatively to sealing the bottom of the cartridge, the cartridge could be packed in a single package which is closed and keeps the infusible material fresh. This package can be made from any material which is suitable to be used with an infusible material, for example plastics like polyethylene, or aluminium, laminates comprising plastic and aluminium.

Alternatively the opening 6 of the cartridge 1 may be closed by a second element of the cartridge which is connected to the cartridge and which is moveable relatively to the first element of the cartridge. Such a cartridge will be opened by moving the second element away from the first element, to expose the filter 7 to the exterior, to open the cartridge before it will be used in the method according to the first aspect of the invention.

The bottom wall 5 and filter 7 of the cartridge 1 may be substantially flat and/or horizontal when in use inside a brewing apparatus. Alternatively, the surfaces may be tilted towards the center of the bottom wall 5, in order to create a conus to direct flow of the brewed beverage, first through the filter, and second through the opening 6. Such a shape may also be beneficial for the mixing and flow pattern inside the brew chamber.

The dimensions of the cartridge are such that the top rim 3 fits to the bottom rim 25 of the brew chamber. Preferably the cartridge is disc shaped. The height or thickness of the cartridge preferably is about 0.5 to 3 centimeters, preferably between 1 and 2 centimeter, and it is among others dependent on the dry volume of the infusible material which needs to be accommodated in the cartridge. The internal volume of the cartridge preferably ranges from 5 to 50 milliliter, preferably from 10 to 40 milliliter. The dimensions and volume of the cartridge are not only determined by the size of the brew chamber. The cartridge should also have an internal volume such that it is able to contain sufficient dry infusible material to prepare a good quality beverage, and on the other hand the cartridge should be able to retain the spent infusible material which is retained on filter 7 after discharging the brewed beverage.

Dependent on the material from which the cartridge is made, the thickness of the wall 4 and bottom 5 will preferably range between 0.1 and 2 millimeter, preferably between 0.5 and 1.5 millimeter, mostly preferred between 0.7 and 0.9 millimeter. Preferably the material from which the cartridge is made comprises polypropylene (PP), such as a PP/PET laminate, more preferably it comprises polypropylene homopolymer. Alternatively the cartridge comprises aluminium.

The dimensions of the opening 6 are determined by on the one hand that the opening should be wide enough in order to discharge the brewed beverage, and on the other hand should be small enough in order to keep in the liquid during the brewing process by suction of gas through opening 6 without dripping. Hence close interaction with the capacity of the preferred gas pump that is able to draw gas from the headspace is required. Also the dimensions of the filter 7 determine this interplay.

Filter 7 in the cartridge is designed such that infusible material remains in the filter when discharging the brewed beverage, such that the beverage which is presented to the consumer is a clear liquid. Filter 7 may be made from any suitable material to withstand the conditions normally applied for brewing a beverage. For example, if the beverage to be brewed is tea, the filter should be able to withstand a temperature of at least 100° C. This requirement limits the materials which are suitable to be used for making the filter. For example materials like plastics which have a softening or melting point below 100° C. are not suitable as filter material. Materials which are suitable are for example the same as used for the cartridge wall and bottom.

The filter 7 may be an integrated part of the cartridge. For example if the cartridge is made from a plastic material and is prepared by a moulding process, the filter may be moulded as an integral part of the cartridge together with the walls 4 and bottom 5 of the cartridge. Preferably this means that the filter 7 may be a flat plate with holes. Alternatively the filter may be affixed into the cartridge after the walls 4 and bottom 5 have been prepared, for example by glueing a woven cloth or film to the bottom 5 to cover the opening 6. In that case the filter may be a flexible material, such as woven, non woven, or perforated film.

Most preferred, the filter 7 is integrally moulded as part of the bottom 5 the cartridge, and preferably the filter material is the same as the construction material of the bottom 5 of the cartridge. In another preferred embodiment the filter 7 is made from the same material as a regular tea bag, for example cellulose with PET/PP layer; or woven or non-woven PET.

The size of the filter openings is designed such that the filter effectively retains the spent infusible material after the brewing process. The shape of the holes in the filter may take any shape, for example channels having a square or rectangular or octagonal cross section. Alternatively the channels may be shaped as cylinders, having a circular or oval cross-section. Alternatively the holes in the filter may be channels having a coned shape, wherein the wider opening of the cone is at the inside of the filter (which is defined as the filter surface area facing the inside of the cartridge and which is in contact with the infusible material), or the other way around (wider opening at the outside of the filter). Alternatively the holes may also be shaped as a cylinder having a waist. The shape of the filter holes depends on the required flow rate of beverage, and flow conditions when discharging the beverage. Moreover the size of the filter holes may depend on the size of the infusible particulate material from which the beverage is brewed. If the infusible particulate material has a relatively small particle size, the required size of the filter pores is relatively small as well, and vice versa. This means that the size of the filter holes preferably is between 0.1 and 1 millimeter. This may for example result in a size of the filter holes between 0.25 and 0.35 millimeter, or between 0.4 and 0.9 millimeter, or between 0.5 and 0.7 millimeter, or between 0.8 and 1.0 millimeter, or any other size within the range between and including 0.1 and 1 millimeter. The shape of the holes in the filter may be square, rectangular, circular, octagonal, or any other suitable shape. In this context, the size of the filter holes is understood to mean the largest cross-sectional dimension of a filter hole. For example, for a circular shape this means the diameter, for a square shape the length of the diagonal between two opposite corners.

Preferably the filter is an integrated part of the bottom of the cartridge and integrally moulded in the bottom of the cartridge by a moulding process. In that case the cartridge and filter are made from the same material. Mostly preferred the thickness of the bottom 5 of the cartridge is about 0.8 millimeter. In a preferred embodiment, the filter 7 in the bottom consists of cylinder shaped holes having a waist, wherein the diameter of a filter hole at the top side of the bottom 5 (inside of the cartridge) is about 0.9 to 1.0 millimeter, preferably about 0.95 millimeter; wherein the diameter of the waist is 0.7 to 0.9 millimeter, preferably about 0.8 millimeter; and wherein the diameter of a filter hole at the bottom side of the bottom 5 (outside of the cartridge) is about 0.9 to 1.0 millimeter, preferably about 0.95 millimeter. The waist preferably is located at the middle of the bottom wall. The total cross-sectional area of the filter holes of a cartridge is preferably between 1 and 4 square centimeter, more preferred between 1.5 and 3.5 square centimeter, most preferred between 2 and 3 square centimeter. The number of holes depends on the size of the holes, and is preferably between 200 and 1000, more preferred between 300 and 900, most preferred between 400 and 800.

In another preferred embodiment, the filter 7 in the bottom consists of cylinder shaped holes having a waist, wherein the diameter of a filter hole at the top side of the bottom 5 (inside of the cartridge) is about 0.65 to 0.8 millimeter, preferably about 0.75 millimeter; wherein the diameter of the waist is 0.5 to 0.65 millimeter, preferably about 0.6 millimeter; and wherein the diameter of a filter hole at the bottom side of the bottom 5 (outside of the cartridge) is about 0.65 to 0.8 millimeter, preferably about 0.75 millimeter. The waist preferably is located at the middle of the bottom wall. In case of a small filter pore size, the required number of holes may be larger than with a relatively large filter pore size, in order to have a sufficiently large surface area for discharge of beverage after brewing.

These preferred dimensions of the filter holes are determined with respect to a brew chamber which has a volume which is more or less the same as the volume a single cup of beverage, meaning about 150 to 350 milliliter, preferably between 200 and 300 milliliter. In case of a brew chamber having a larger or smaller volume, the corresponding required cross-sectional area of the filter will increase or decrease.

Preferably gas that is drawn out of the headspace of the brew chamber in step b), is pulled out by the gas pump that preferably is integrated in the brewing apparatus, together with connecting means between the headspace and the gas pump. The gas flow rate of the preferred gas pump that is able to draw gas out of the headspace of the brew chamber in step b) should be such, that the flow rate of the gas which is consequently pulled into the brew chamber, prevents the beverage to be dripping out of the opening 6 before the gas flow is terminated. Consequently there is an interplay between the gas flow rate, the volume of the brew chamber, and the cross-sectional area of the filter holes. Preferably the gas flow rate of the pump without load is between 2 and 10 liters per minute, preferably between 3 and 8 liter per minute, more preferred between 4 and 6 liter per minute (all at a pressure of 1 atmosphere). As long as in step b) gas is drawn out from the headspace of the brew chamber, gas is pulled into the brew chamber through opening 6 and filter 7, in order to prevent that an underpressure occurs in the brew chamber.

Water is introduced to the brew chamber in step c) of the method according to the first aspect of the invention. This introduction of water is at least partly simultaneous with the drawing of gas out of the brew chamber in step b). This means that introduction of water in step c) may start simultaneous with starting drawing of gas out of the brew chamber in step b). Step c) may also start later than step b). Addition of water to the brew chamber may stop earlier than terminating drawing gas out of the headspace in step d), and it may also stop simultaneous terminating drawing gas out of the headspace in step d). While water is inside the brew chamber, the brewing process commences in step c), because the infusible material is extracted by the water.

By the suction of gas out of the headspace of the brew chamber, simultaneously gas is pulled in through the opening 6 and filter 7 of the cartridge. When the brew chamber is filled with water, preferably hot water, while pulling in gas, this leads to the formation of gas bubbles which rise in the brewing liquor. The gas bubbles cause agitation of the brewing liquor in the brew chamber. The flow of brewing liquor and the gas bubbles cause upwelling of the infusible material, leading to the mixing of the ingredient with the brewing liquor, in order to facilitate and improve the infusion process. Moreover the infusible material is also mixed with the water by the filling of the brew chamber with water, leading to a water current from the openings 24 and/or 26 to the cartridge and consequently the twirling of the infusible material by the current. This leads to the infusible material being evacuated from the cartridge and mixed with the water, optimising brew efficiency. Moreover gas that is pulled in through the opening 6 of the cartridge also retains the beverage in the brew chamber, as the gas flow into the cartridge from the bottom prevents leaking of the beverage through opening 6.

Preferably at the start of the brewing process the gas flow rate out of the headspace is relatively high, in order to whirl up the infusible material in the cartridge and mix it with water. While in the brewing process, the gas flow rate can be decreased, as the mixing will continue with a smaller gas flow rate. This method saves energy as compared to keeping the gas flow at a continuous high rate. In case of a brew chamber having a volume of preferable between 150 and 350 milliliter, and a filter 7 wherein the holes have a cross-sectional area of between 1 and 4 square centimeter, the initial gas flow rate is preferably between 4 and 6 liter per minute, followed by a decrease to preferably 2 to 4 liter per minute (all at a pressure of 1 atmosphere).

The water which is added to the brew chamber in step c) of the method of the invention, will in general be warm water or hot water. In the context of the present invention this means that preferably the temperature of the water is between 80° C. and 100° C. when added to the brew chamber, more preferably between 85° C. and 95° C. Preferably the water will be heated in a boiler which is present inside the brewing apparatus. The water may also be heated in an external boiler before being fed to the brewing apparatus. Usually the water temperature will drop a few degrees during the brewing process. For example if the water has a temperature of about 90° C. in the boiler, it may have a temperature of about 85° C. in the brew chamber. Usually the brew chamber will be filled quickly with water, for example within 5 seconds, such that sufficient time is available for brewing the beverage. Alternatively the water temperature may be kept at ambient temperature or even cooled to a temperature to below ambient temperature, in order to brew a cold beverage, such as ice tea.

The brewing time is determined by the gas that is drawn out of the headspace of the brew chamber: The brewing time in step c) of the method according to the invention may range from about 15 seconds to about 5 minutes, and may be varied by the skilled person in order to prepare a good quality beverage. Preferably the brewing time is shorter than 4 minutes, preferably shorter than 3 minutes, preferably shorter than 2 minutes, and more preferably shorter than 1 minute. More preferred the brewing time is between 18 and 45 seconds, more preferred between 20 and 40 seconds. This brewing time can be optimised based on the infusible material, the required strength of the beverage, and the minimum or maximum required waiting time for an operator of the brewing apparatus.

After the beverage has obtained its required strength, the liquor is dispensed through the opening 6 of the cartridge 1. This dispensing is triggered by terminating the suction of gas out of the headspace of the brew chamber, and hence the suction of gas through the opening 6 into the cartridge and the brew chamber stops. This leads to the flow of the brewed beverage through the opening, and the infusible material remains behind on the filter 7. The beverage preferably is discharged under gravity. Preferably gas may also be blown into the headspace of the brew chamber during discharge of the beverage, through opening 24 or 26 or another opening. This gas creates an overpressure, which leads to acceleration of the discharge of the liquid. Finally a clear beverage is obtained, without solid parts of the infusible material remaining in the beverage.

Generally the term 'gas' in the context of the present invention is understood to be air. However in some instances also other gases or gas mixtures may be pulled into the brew chamber. Examples of other gases which may be used are nitrogen, or oxygen.

The gas may be pulled out of the brew chamber by a gas pump, which may form an integrated element of the brewing apparatus. Alternatively such a pump may be an external pump, as long as gas can be pulled from the headspace.

The optional blowing of gas into the headspace for discharge of beverage can be achieved by reverting the flow direction of the preferred gas pump which may be able to draw gas out of the headspace, such that it blows gas into the headspace of the brew chamber. Alternatively the brewing apparatus may comprise both a gas pump for suction of gas out of the brew chamber as well as a gas pump for blowing gas into the upper part of the brew chamber. The gas may be sucked out through the opening 24. Gas may be blown into the brew chamber also through the opening 24, or alternatively through another opening in the upper part of the wall 22 of the brew chamber 21 or another opening in the lid 23 of the brew chamber 21.

The opening 6 of the cartridge preferably has a cross-sectional area such that the content of the brew chamber can be discharged within a time period of about 4 to 10 seconds, preferably 5 to 8 seconds. Preferably this discharge time is not too short, otherwise the beverage will splash into a cup or cartridge when being discharged. On the other hand, the discharge time preferably is not too long, as otherwise it takes too long for the consumer to wait for the filling of the cup of cartridge with brewed beverage. Preferably the opening 6 is circular and has a diameter of between 0.5 and 4 centimeter, preferably between 0.8 and 3 centimeter, more preferred between 1 and 2.5 centimeter. The maximum size of the opening 6 of the cartridge is also limited by the gas flow rate: if the opening 6 is too large, then the flow rate of the gas that is pulled into the brew chamber is too low to keep the brewed beverage inside the brew chamber and undesirable leaking of beverage will occur. Alternatively the opening is not circular but ring shaped, or any other shape like square or rectangular or octagonal or the like, having the same preferred cross-sectional area as the circular shape.

The discharge time will also depend on the filter size, volume of the brew chamber and the infusible material particle size. Some ingredient may lead to more blockage of the filter than other ingredients, which consequently may lead to a lower discharge rate. A typical discharge rate is between 1.5 and 3 liter per minute, preferably between 1.8 and 2.5 liter per minute.

The infusible material may be any suitable ingredient to brew a hot beverage. Especially suitable ingredients to be used in combination with the cartridge in the method according to the invention are tea, herbs, coffee, and cocoa. Most preferred to be used as infusible materials are tea and/or herbal compositions. In this context, tea is understood to mean leaves from the plant *Camellia sinensis*, as is commonly understood by the consumer to be tea. In addition to tea leaves and/or herbal compositions, the infusible material preferably also may contain ingredients which give a special flavour to the brewed beverage, such as spices, pieces of lemon or other fruits. The tea leafs may be flavoured, for example with bergamot oil to provide earl grey tea, or any other flavour. The tea may also be flavoured with fruit. The tea may be green tea or black tea. The herbal compositions can be used to make so-called herbal infusions. Non-limiting examples of herbal infusions are mint and camomile. Also any combination of tea, herbs, fruits, and flavours is possible.

The particle size of the infusible material are chosen such that preferably a beverage can be brewed within the brewing time, and preferably such that the infusible particulate material has a particle size larger than the hole size of the filter 7. Consequently the infusible material is retained on the filter when the beverage is discharged in step d) of the method according to the invention. Preferably the infusible material is reduced in size by cutting or grounding or chopping or breaking, or by any other suitable method, such that the infusible particulate material has an average particle size between 0.1 and 10 millimeter, which corresponds to a mesh size of about 150 to about 2.5. Preferably the smallest size of the infusible material corresponds to the size of the filter holes. For example, in case the filter holes have a size of about 0.6 millimeter, the infusible material has been cut to a size of at least 0.6 millimeter as well (about 28 mesh). More preferably the infusible material has been cut to a size between 1 and 8 millimeter (about 16 and 3 mesh), most preferably between 1 and 5 millimeter (about 16 and 4 mesh). Nevertheless the infusible material may contain some very fine material or dust which will be able to pass through the filter. The infusible material preferably has a good tendency to suspend in water, rather than float in water. This means that preferably the infusible material is able to be wetted when the water is added to the brew chamber in step c) of the method according to the invention.

In a preferred embodiment the brew chamber 21 contains one or more additional water inlet ports, which are located close to the lower edge 25 of the brew chamber 21. This optional water inlet port can be used to introduce water when starting a brewing cycle, in order to agitate the infusible material from the cartridge and mix it with the introduced water. This optional water inlet port is arranged preferably at an angle of at least 45 degrees relative to the wall 22, more preferably at least 60 degrees, more preferably at least 75 degrees relative to the wall 22. Most preferably the optional lower water inlet port is arranged substantially perpendicular to the wall 22. This optional water inlet port preferably is connected via pipes and tubing with the same water supply which is connected to the openings 24 and/or 26.

The amount of dry infusible material in a cartridge prior to use is preferably so much that a good quality beverage can be brewed which is not too strong and not too weak, and which does not take too much time for brewing. This means that preferably the amount of infusible material is between 0.5 and 5 gram per cartridge, preferable between 1 and 4 gram, more preferably between 1.5 and 3.5 gram per cartridge.

Optionally the brew chamber can be cleaned from small parts of the infusible material which may be left behind after discharging the beverage, for example some parts may be stuck against the internal wall of the brew chamber. Hence in a next step of the method according to the first aspect of the invention, the brew chamber can be cleaned by rinsing with water. Moreover this water is also used to wash off brewed beverage from the wet infusible material which is kept on the filter after discharge of the liquid. The rinsing water is also discharged through the opening 6, leaving infusible material on filter 7. The advantage of the rinsing step is that no flavour carry over occurs in between brews, leading to good quality beverages. The internal walls of the brew chamber are effectively cleaned by the introduction of the rinsing water, both from infusible material which may stick to the internal wall, as well as remainder of the brewed beverage. As the device has no moveable parts below the opening 6 of the cartridge, no deposits of beverage or flavours from the beverage onto a machine part occurs, and hence no carry over of flavours or deposits from a previous brew into a next brew will occur.

In case of a rinsing step, the rinsing water preferably is introduced into the brew chamber 21 via the openings 24 and/or 26 which can be used as a water inlet ports. If hot water is used for this optional rinsing, then preferably the water is tapped from the same boiler as the water in step c). In that case rinsing would be most effective if the water flow is directed around the wall 22, slowly spiralling downward. Hence the upper water inlet ports 24 and/or 26 are arranged to direct the water in a substantially horizontal fashion into the brew chamber 1 such that the water travels along the wall 22 in a downward spiral thereby to effect rinsing. Preferably the angle between the openings and the wall is less than 30 degrees, more preferably less than 15 degrees and most preferably, the water inlet ports 24 and/or 26 are arranged substantially tangentially to the wall 22. Rinsing is even more effective when more than one upper water inlet ports are employed and therefore the brew chamber 21 preferably comprises 2 or more upper water inlet ports 24 and 26 which may be in communication with the same, or independent, water supplies.

In order to allow inlet water to be directed around the wall 22 of the brew chamber 21 the beverage brewing machine preferably comprises a brew chamber 21 that is substantially cylindrical as described in the embodiment above. The preferably cylindrical brew chamber 21 has a cross section that is in the form of a circle, but other configurations may be employed as well. However, it is preferred that the inner surface of the brew chamber 1 is substantially curved to allow water to flow around it and therefore a preferred cross section is in the form of an oval or a circular form.

After brewing the beverage, the cartridge can be removed from the brew chamber, and disposed of or cleaned. If cleaned then the cartridge can be filled with fresh infusible material before being attached to the brew chamber again, for brewing a second beverage. By the removal of the cartridge from the brew chamber, and cleaning it or replacing for another one, no flavour carry over between brews will occur.

Cartridge for Use in the Method According to the First Aspect of the Invention

With reference to non-limiting FIGS. 2 to 11, in a second aspect the present invention provides a cartridge for connecting to a brew chamber for brewing a beverage, comprising a first element 51 and a second element 71, wherein the first element 51 comprises a side wall 52 and a bottom wall 53, wherein the side wall 52 and bottom wall 53 are made from a water-impermeable material, wherein the bottom wall 53 contains a protuberance 54 that directs to the outside of the first element 51, wherein the bottom wall contains an opening 55, wherein the opening comprises a filter 56 which is permeable to water, wherein the top is optionally closable by a seal 58 and which is attachable to the upper rim 59 of the side wall 52, and wherein the bottom wall 53 comprises one or more notches 60 directed to the inside of the first element 51, and wherein the second element 71 comprises a bottom wall 72, wherein the bottom wall 72 is made from a water-impermeable material, wherein the bottom wall 72 comprises an opening 73 which is able to interlock with protuberance 54 in order to create a water-tight connection, wherein the bottom wall 72 contains one or more protuberances 74 which are able to interlock with the corresponding one or more notches 60, and wherein the second element 71 is moveable relative to the first element 51 about the corresponding notch 60 and protuberance 74.

A preferred embodiment of the cartridge is described with reference to FIGS. 2 to 11. In this case the cartridge is described as a disc-shaped cartridge, having a circular circumference when viewed from above. However, the cartridge may have any other suitable shape, like square, or rectangular, or oval, as long as the cartridge fits to the brew chamber in the brewing apparatus.

FIG. 2 shows a side view of a preferred non-limiting embodiment of a cartridge according to the second aspect of the invention. The cartridge comprises a first element 51 and a second element 71. The first element comprises a side wall 52 and a bottom wall 53. The second element comprises a bottom wall 72. A gap 75 is provided between the first element and the second element. Optionally the first element 51 is closed with a seal 58. This seal preferably is a peel-off seal.

FIG. 3 shows a top view of the preferred non-limiting cartridge as shown in FIG. 2. The first element 51 is closed with an optional seal 58.

Figure 4:
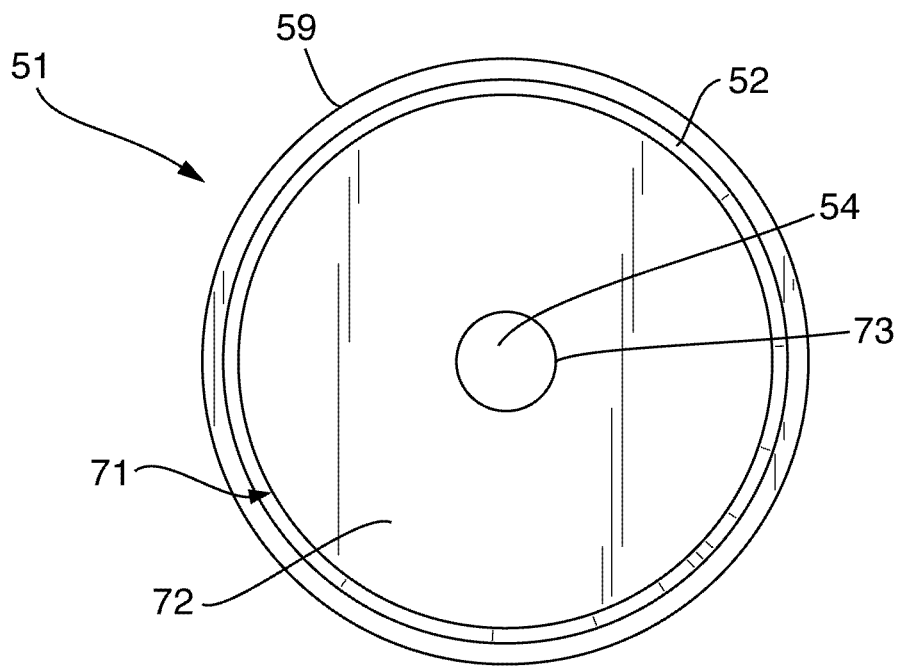
FIG. 4: Bottom view of a preferred cartridge according to the second aspect of the invention.

FIG. 4 shows a bottom view of a the preferred non-limiting cartridge as shown in FIGS. 2 and 3. The cartridge comprises a first element 51 and a second element 71. The first element comprises an upper rim 59 of a side wall 52 and a protuberance 54 in the bottom wall 53. The second element 71 comprises a bottom wall 72, and this bottom wall 72 contains an opening 73. This opening 73 interconnects with protuberance 54, such that protuberance 54 closes opening 73.

FIG. 5 shows a side view of a preferred non-limiting cartridge according to the second aspect of the invention, at the section of the line A-A as indicated in FIG. 3. FIG. 5 shows a closed cartridge, such that protuberance 54 of the first element 51 closes opening 73 of the second element 71. FIG. 6 shows the same preferred non-limiting cartridge, at the section of the line A-A as indicated in FIG. 3. FIG. 6 shows an opened cartridge, such that protuberance 54 of the first element 51 does not close opening 73 of the second element 71.

With reference to FIGS. 5 and 6, the preferred non-limiting cartridge will be described here. A cartridge according to the second aspect of the invention is suitable for connecting to a brew chamber and brewing a beverage such as tea or any other beverage. The cartridge comprises a first element 51 and a second element 71,
wherein the first element 51 comprises a side wall 52 and a bottom wall 53. The side wall preferably has an angle relative to vertical of between 0 and 45°. As the cartridge is suitable for use in preparation of a beverage, the side wall 52 and bottom wall 53 are made from a water-impermeable material. The beverage to be prepared preferably is a hot beverage, hence preferably the material of the side wall 52 and bottom wall 53 is able to withstand a temperature of about 100° C. or even more, during a period of preferably at least 10 minutes, more preferably at least 5 minutes. The bottom wall of the first element contains a protuberance 54 that directs to the outside of the first element 51. In the present non-limiting embodiment this protuberance is surrounded by an opening 55 in the bottom wall 53, and this opening comprises a filter 56 which is permeable to water. The filter 56 may be an integrated part of the bottom wall 53. For example if the first element of the cartridge is made from a plastic material and is moulded in order to give it the correct size and shape, the filter may be moulded as an integral part of the bottom wall 53. Alternatively the filter may be affixed into the first element 51 of the cartridge after this first element has been prepared, for example by glueing a woven cloth or film to the bottom wall 53 to cover the opening 55. If the filter is integrally moulded in the first element of the cartridge, preferably the filter material is the same as the construction material of the bottom wall of the cartridge. In another preferred embodiment the filter 56 is made from the same material as a regular tea bag, for example cellulose with PET/PP layer; or woven or non-woven PET.

The top of the first element 51 is optionally closable by a seal 58 which is attachable to the upper rim 59 of the side wall 52. The seal may comprise any material which has been described herein before, and may be attached to the first element by any method which has been described herein before. Preferably the upper rim 59 of the side wall comprises a flange, which can be used for attachment of the optional seal to the first element 51, and which also may be functional in the connecting of the cartridge to the brew chamber. The bottom wall 53 comprises one or more notches 60 directed to the inside of the first element 51. This notch 60 is present in order to accommodate a corresponding protuberance 74 of the second element 71 of the cartridge. Preferably this notch is continuous, ring-shaped, and follows the circumference of the bottom wall. Alternatively there may be two or more notches 60 which are not ring-shaped and not continuously following the circumference of the bottom wall. For example there may be 4, 6, 8, 10, or 12, or any other reasonable number of notches in the form of cylinders, such that the corresponding protuberances 74 are pins which fit into the notches 60.

Figure 7:
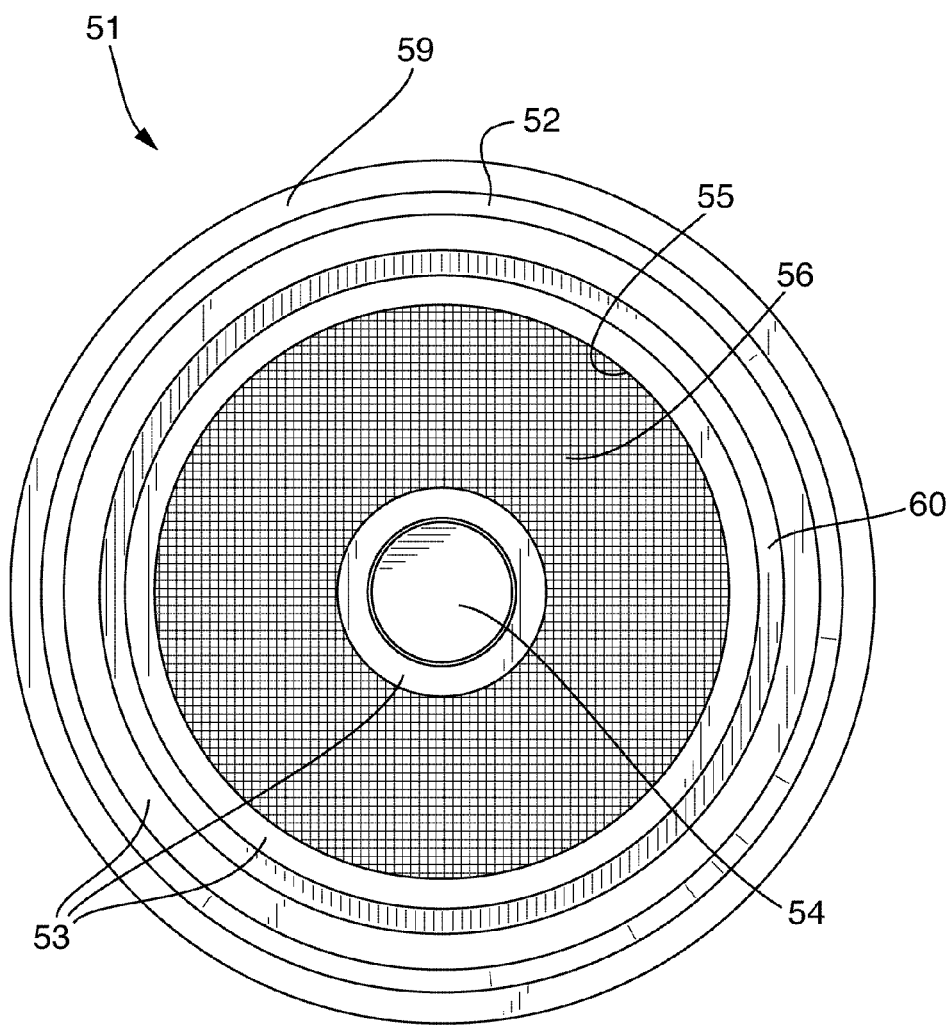
FIG. 7: Bottom view of the first element (51) of a preferred cartridge according to the second aspect of the invention.

FIG. 7 shows the bottom view of the preferred non-limiting embodiment of the first element 51. In this specific embodiment the cartridge has a circular circumference, and the protuberance 54 is located in the middle of the bottom wall 53. The opening 55 comprises a filter 56. The notch 60 has a continuous shape following the circumference of the bottom wall 53.

The second element 71 comprises a bottom wall 72, wherein the bottom wall 72 is made from a water-impermeable material. As the beverage to be prepared preferably is a hot beverage, hence preferably the material of the bottom wall 72 is able to withstand a temperature of about 100° C. or even more, during a period of preferably at least 10 minutes, more preferably at least 5 minutes. The bottom wall 72 comprises an opening 73 which is able to interlock with protuberance 54 of the first element 51. By this interlocking a water-tight connection is created, which functions to close the opening 55 of the first element 51. This closed position is the usual position of the first element 51 and second element 71 when the cartridge is brought into a brewing apparatus for brewing a beverage.

The bottom wall 72 contains one or more protuberances 74 which are able to interlock with the corresponding one or more notches 60 of the first element 51. The second element 71 is moveable relative to the first element 51 about the corresponding notch 60 and protuberance 74. The notch 60 and protuberance 74 make it possible that the second element 71 moves from the first element 51, as the protuberance 74 can slide inside the notch 60 to disconnect the protuberance 54 from opening 73. The number and shape of the one or more protuberances 74 corresponds to the number and shape of the corresponding one or more notches 60.

This movement of the second element 71 from the first element 51 will generally be carried out inside the brewing apparatus, when the cartridge has been connected to the brew chamber. The movement of the second element 71 from the first element 51 will lead to exposure of opening 55 and filter 56 to the atmosphere. The brewing process can commence after opening of the bottom part of the first element 51 by filling the brew chamber with water and sucking out gas, preferably air, from the headspace of the brew chamber. Consequently gas, preferably air, will be sucked into the cartridge and the brew chamber through opening 73 of the second element 71, and through opening 55 and filter 56 of the first element 51. The infusible material, which will usually be present inside the cartridge when the cartridge is introduced into the brewing apparatus, will be mixed with the water due to the water flow and the gas bubbles rising from the filter 56.

When the beverage has reached its desired strength the gas pump is switched off, and consequently no gas is sucked into the cartridge anymore through the opening 55 and filter 56. This leads to discharge of the beverage through the opening 55, filter 56 (that retains the spent infusible material), and through opening 73 of the second element 71.

Figure 8:
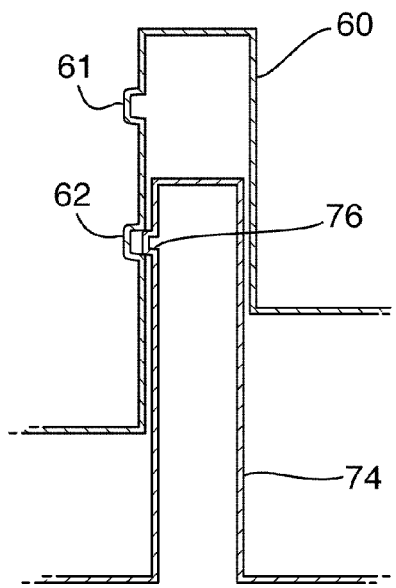
FIG. 8: Detailed view of the protuberance (74) of the second element (71) and the notch (60) of the first element (51) of a preferred cartridge according to the second aspect of the invention.

FIG. 8 shows a preferred embodiment of the protuberance 74 of the second element and the notch 60 of the first element 51. The notch 60 preferably comprises two notches 61 and 62 pointing towards the inside of the first element 51. These two notches 61 and 62 preferably follow the circumference of the notch 60 and the bottom wall 53. A corresponding protuberance 76 can interlock with the notches 61 and 62. When the first element 51 is closed by the second element 71, then protuberance 75 will be interlocked with notch 61. Upon moving of the second element 71 from the first element 51, and exposing the opening 55 and filter 56 to the atmosphere, the protuberance 76 will be interlocked with notch 62. The latter interlocking also results into directing the flow of the brewed beverage into the opening 73, as a water-tight connection is created by the latter interlocking. The distance between the notches 61 and 62 determines how far the second element 71 is moved from the first element 51 upon opening of the first element 51.

Figure 9:
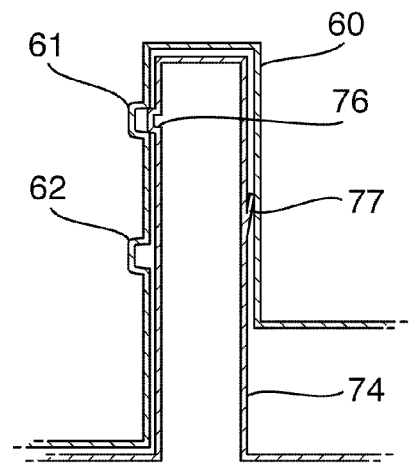
FIG. 9: Detailed view of the protuberance (74) of the second element (71) and the notch (60) of the first element (51) of a preferred cartridge according to the second aspect of the invention; closed position; containing element (77).
Figure 10:
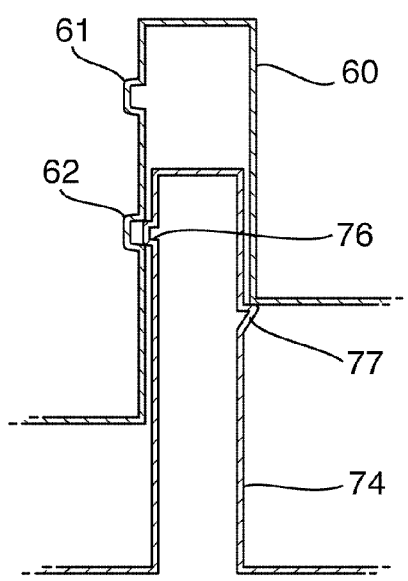
FIG. 10: Detailed view of the protuberance (74) of the second element (71) and the notch (60) of the first element (51) of a preferred cartridge according to the second aspect of the invention; open position; containing element (77) which prevents that the second element (71) moves upward relative to the first element (51).

FIGS. 9 and 10 disclose a preferred method to prevent that the second element 71 moves relative to first element 51 to close it again, after the first element 51 has been opened. This is achieved by a protuberance 77, which is clenched between the protuberance 74 and inner wall of notch 60 when the first element 51 is closed by second element 71 (FIG. 9). After opening of the first element 51 by moving second element 71 downwards (FIG. 10), and interlocking protuberance 76 with notch 62, the protuberance 77 will move outward and prevent that second element 71 will move upward relative to first element 51.

Figure 11:
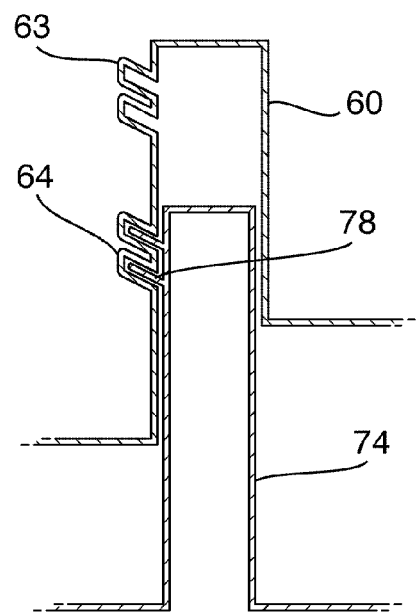
FIG. 11: Detailed view of the protuberance (74) of the second element (71) and the notch (60) of the first element (51) of a preferred cartridge according to the second aspect of the invention; open position; notches (78) which fit in holes (63) and (64) prevent that the second element (71) moves upward relative to first element (51).

Alternatively to the preferred embodiment disclosed in FIGS. 8, 9, and 10, alternative interlocking systems may be used, such as for example shown in FIG. 11. In this the notch 60 comprises notches 63 and 64 which are directed slightly upward and the inside of the first element. Both notch 63 as well as notch 64 may comprises one, two (as indicated in FIG. 11), or more notches. The corresponding protuberances 78 on the protuberance 74 interlock with these notches 63 and 64 respectively upon movement of the second element 71. The protuberances 78 lock the second element 71 relative to the first element 51, and they serve as a water-tight connection, to direct the flow of beverage to the opening 73. The protuberances 78 additionally prevent moving the second element 71 towards the first element 51 during operation of the machine, as the protuberances 78 serve as barbs.

The thickness of the bottom wall 72 is determined by the possibility for the bottom wall 72 to lock the first element 51, and be able to direct the flow of brewed beverage to opening 73. The thickness of the protuberance 54 preferably is equal to the thickness of bottom wall 72, such that when the cartridge is in closed position, the bottom surface appears to be a continuous surface.

The bottom wall 53 and filter 56 of the first element 51 and the bottom wall 72 of the second element 71 may be substantially flat and/or horizontal when in use inside a brewing apparatus. Alternatively, the surfaces may be tilted towards the center of the bottom wall 53 and the bottom wall 72, in order to create a conus to direct flow of the brewed beverage, first through the filter, and second through the opening 73. Such a shape may also be beneficial for the mixing and flow pattern inside the brew chamber.

The sizes of the opening 55 and the holes in the filter 56 are determined by on the one hand the required speed of discharge of the brewed beverage, and on the other hand the capacity of the gas pump to suck gas out the headspace and consequently to suck in gas, preferably air, into the cartridge and brew chamber through opening 73, opening 55 and filter 56. This suction of gas into the brew chamber serves to keep the beverage inside the cartridge during the brewing process.

The dimensions of the cartridge and the filter indicated in the context of the first aspect of the invention, are applicable to the cartridge and the filter of the second aspect of the invention mutatis mutandis.

Preferably both the first element 51 and second element 71 are made from the same material, preferably a rigid plastic, preferably polypropylene. The elements preferably are prepared by injection moulding. The thickness of the side wall 52, bottom wall 53, and bottom wall 72 preferably is preferably between 0.1 and 2 millimeter, more preferably between 0.5 and 1.5 millimeter, and most preferably between 0.6 and 1.0 millimeter.

The pores of the filter holes preferably have a size between 0.1 and 1 millimeter. This may for example result in a size of the filter holes between 0.25 and 0.35 millimeter, or between 0.4 and 0.9 millimeter, or between 0.5 and 0.7 millimeter, or between 0.8 and 1.0 millimeter, or any other size within the range between and including 0.1 and 1 millimeter. The shape of the holes in the filter may be square, rectangular, circular, octagonal, or any other suitable shape. In this context, the size of the filter holes is understood to mean the largest cross-sectional dimension of a filter hole. For example, for a circular shape this means the diameter, for a square shape the length of the diagonal between two opposite corners.

Preferably a cartridge according to the second aspect of the invention contains an infusible particulate material having a particle size larger than the pore size of the filter (56). This infusible material preferably comprises tea leaves and/or a herbal composition. As in the first aspect of the invention, preferably the infusible material is cut and/or ground in pieces, such that the infusible material has an average particle size between 0.1 and 10 millimeter (which corresponds to a mesh size of about 150 to about 2.5). Preferably the smallest size of the infusible material corresponds to the size of the filter holes. More preferably the infusible material has been cut to a size between 1 and 8 millimeter (about 16 and 3 mesh), most preferably between 1 and 5 millimeter (about 16 and 4 mesh). Nevertheless the infusible material may contain some very fine material or dust which will be able to pass through the filter.

All preferred embodiments of the cartridge which have been described in the context of the first aspect of the invention, may be preferred embodiments of the cartridge according to the second aspect of the invention, mutatis mutandis.

Method for brewing beverage using the cartridge of second aspect of the invention With reference to non-limiting FIGS. 2 to 11, in a preferred embodiment of the first aspect of the invention, the present invention also provides a method for brewing a beverage in a brewing apparatus using a cartridge according to the first aspect of the invention, wherein the apparatus comprises a brew chamber 21 that comprises a side wall 22, a bottom rim 25, a top wall 23, and an opening 24, and means to connect a cartridge to the brew chamber, comprising the steps:

a) optionally releasing seal 58 from the cartridge, wherein the protuberance 54 of the first element 51 is interconnected with the opening 73 of the second element 71 to close the bottom wall 53 of the first element 51;

b) putting the cartridge into the brewing machine and connecting the top rim 59 of the first element of the cartridge to the bottom rim 25 of the brew chamber, such that a water-tight connection is made;

c) optionally prior to or simultaneous with step b), moving the second element 71 of the cartridge relative to the first element 51 of the cartridge, such that the filter 56 is exposed to the atmosphere;

d) drawing gas out of the brew chamber through opening 24 or through optional opening 26, and simultaneously drawing gas into the brew chamber through opening 55 and filter 56 of the cartridge;

e) at leastly partly simultaneous with step d), filling the brew chamber 21 with water, and brewing the beverage by mixing water and infusible particulate material in the brew chamber 21; and f) terminating drawing of gas out of the brew chamber and discharging the brewed beverage through opening 55.

Steps a) and b) may be performed in either sequence, first a) and then b), or first b) and then a). If in step a) the cartridge is a new cartridge which is sealed, then usually the seal 58 is peeled off the cartridge first before the second element 71 is moved away from the first element 51 to open the first element 51. This optional seal could be removed manually by the operator of the machine, or could be taken off when the cartridge has been placed in the brewing apparatus, by a mechanical machine appliance or manually. Usually the cartridge will be in a closed position before it will be applied to the brewing apparatus, meaning that the second element 71 is positioned against the first element 51 and the opening 73 is closed by the protuberance 54. However the second element 71 may be moved away from the first element 51 to open the first element 51 before the cartridge is applied to the brewing apparatus. That means that step c) may be conducted before step b) or step a).

If the cartridge is a re-usable cartridge, then the cartridge may not have a seal to close the top part. In that case the cartridge may be open already, in the sense that the second element 71 may have been moved away from first element 51 to open the first element 51.

In steps b) and c) the top rim of the cartridge is connected to the under rim of the brew chamber, and the second element 71 is moved away from the first element 51 to open the first element 51 and expose the filter 56 to the atmosphere. These steps could take place in any order or simultaneously. Connecting the cartridge to the brew chamber may be done manually by the operator using a clamp or any other suitable fastening device, or may be done automatically by the brewing apparatus. Hence the means to connect a cartridge to the brew chamber could be a mechanical device like a clamp, or could be a press that pushes the cartridge against the brew chamber, or any other suitable mechanical element. The opening of the cartridge by moving the second element 71 from the first element 51 could also be conducted manually by the operator, or could be done automatically by the brewing apparatus.

After connecting the cartridge to the brew chamber and opening the cartridge the brewing process commences in steps d) and e). In these steps the vacuum pump is started to draw gas out of the headspace of the brew chamber, which will lead to the pulling of gas into the brew chamber through opening 55 and filter 56 of the cartridge. Meanwhile the brew chamber is filled with water in step e), preferably hot water, through inlet 24. Due to the pulling in of gas through filter 56, gas bubbles are formed which rise from the filter 56 to the headspace of the brew chamber, meanwhile mixing the infusible material with the water. This way the beverage is brewed effectively.

The introduction of water in step e) is at least partly simultaneous with the drawing of gas out of the brew chamber in step d). This means that introduction of water in step e) may start simultaneous with starting drawing of gas out of the brew chamber in step d). Step e) may also start later than step d). Addition of water to the brew chamber may stop earlier than terminating drawing gas out of the headspace in step f), and it may also stop simultaneous terminating drawing gas out of the headspace in step f). While water is inside the brew chamber, the brewing process commences in step e), because the infusible material is extracted by the water.

If the beverage has sufficiently brewed, the drawing of gas from the headspace is terminated in step f), and consequently the pulling of gas through filter 56 into the brew chamber is terminated as well, and the brewed beverage is discharged through opening 55 and filter 56 into a receptacle.

In a third aspect the present invention provides an apparatus for brewing a beverage using a cartridge according to the second aspect of the invention, containing a brew chamber and means to connect a cartridge to the brew chamber such that a water-tight connection is formed, and means to move the second element 71 of the cartridge relative to the first element 51 of the cartridge about the corresponding notch 60 and protuberance 74, wherein said means comprise a holder which fits in a gap 75 between the first element 51 and the second element 71, and wherein the holder can move relative to the first element 51 to increase the width of the gap 75 between the first element 51 and the second element 71. This apparatus is especially suitable to be used in combination with the cartridge according to the second aspect of the invention.

In a preferred embodiment the apparatus is equipped with a drawer to accommodate a cartridge according to the second aspect of the invention. The following preferred, non-limiting operation mode may be applied. The optional seal 58 is removed from the first element 51. This removal of the optional seal 58 can be done manually, before the cartridge is put into the drawer, or can be done inside the drawer, either by a mechanism which is part of the machine, or manually after placing the catridge in the drawer. A cartridge, wherein the protuberance 54 is interconnected with opening 73 to close the first element 51, is inserted into the drawer. Upon closure of the drawer, the cartridge is positioned underneath the brew chamber. When the drawer is closed, the cartridge can be opened by moving the second element 71 from the first element 51, and the opening 55 and filter 56 are exposed to the atmosphere. Subsequently the cartridge is tightly connected to the brew chamber, preferably by using optional flange 59. The connecting the cartridge to the brew chamber and the opening of the cartridge by moving the second element 71 from the first element 51 could be done the other way around as well.

The brew chamber of the apparatus according to the fourth aspect of the invention preferably comprises a transparent side wall. This has the advantage that the operator and consumer can observe the improved brewing process. This observation has the advantage that the consumer perceives the consumed beverage to be more special to him or her. This is compared to a similar beverage which is served to the consumer, while the consumer has not observed its brewing process, or which has been prepared in a conventional way (e.g. tea using a tea bag). By the perception of a beverage to be more special, the perceived high quality and uniqueness of the beverage is enforced. Moreover by using a transparent side wall, the operator and consumer will be reassured that the brew chamber is indeed clean after rinsing before a new brewing cycle will commence.

In a fourth aspect the present invention provides a method for opening a cartridge according to the second aspect of the invention, wherein the protuberance 54 of the first element 51 of the cartridge is interconnected with the opening 73 of the second element 71 to close the bottom wall 53 of the first element 51, wherein the second element 71 is moved from the first element 51 about the corresponding notch 60 and protuberance 74, to expose the filter 56 to the atmosphere. This method is especially suitable to be performed by the apparatus according to the third aspect of the invention, in combination with the cartridge according to the second aspect of the invention.

Preferred aspects disclosed in connection with either of the first, second, third, and fourth aspects of the present invention may also be applicable to the other aspects of the present invention, mutatis mutandis. The various features and embodiments of the present invention, referred to in individual sections below apply, as appropriate, to other sections, mutatis mutandis. Consequently features specified in one section may be combined with features specified in other sections, as appropriate. All publications mentioned in this specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the claims.

EXAMPLES

The following non-limiting examples illustrate the present invention.

Example 1

Beverage Brewing Apparatus

With reference to non-limiting FIGS. 1 to 11, a beverage brewing apparatus was designed and assembled, for brewing a beverage by using a removable cartridge containing tea leaves. The apparatus was equipped with:
  a brew chamber, having the following characteristics: cylindrical shape, 135 mm high, 60 mm outer diameter, 54 mm inner diameter (gross volume: about 300 milliliter), material glass (transparent);
  a vacuum pump, for drawing out air from the headspace of the brew chamber, as well as pipes, tubes, connectors and a valve to connect the vacuum pump to the brew chamber;
  an air pump to blow air into the headspace of the brew chamber, as well as pipes, tubes, connectors and a valve, to connect the air pump to the brew chamber;
  a boiler for heating water to a temperature of about 92° C.;
  a water pump to pump the water from the boiler to the brew chamber, as well as pipes, tubes, connectors and a valve, to connect the boiler to the brew chamber;
  a process controller to control the operation of the pumps and valves.

A cartridge according to the preferred embodiment disclosed in FIGS. 2 to 7 was used. The cartridge had a disc shape, and the first element 51 and the second element 71 of the cartridge were made from polypropylene, which had been injection moulded having the correct shape and size. The side wall 52 and bottom wall 53 of the first element 51 as well as the bottom wall of the second element 71 had a thickness of 0.8 mm. The internal diameter of the first element 51 between the flanges 59 was 54 mm, the total outer diameter of the second element 71 at the position of the bottom wall 72 was 46.5 mm, and the total height of the cartridge (in closed position) was 20.25 mm. The width of the gap 75 was 1.5 mm. Upon moving the second part 71 from the first part 51 the width of the gap 75 was increased to 6 mm.

The filter 56 was moulded into the cartridge and formed an integrated part of the bottom of the first element 51. The filter contained 450 holes, which were cylinder shaped having a waist. The diameter of a filter hole at the top side (inside of the cartridge) was about 0.95 millimeter; the diameter of the waist was about 0.85 millimeter; and the diameter of a filter hole at the bottom side of the cartridge (outside of the cartridge) was about 0.95 millimeter. The total cross-sectional area of the filter holes consequently was about 2.5 square centimeter.

The cartridge was filled with 2.5 grams black tea.

After the cartridge has been connected to the brew chamber, and the second element 71 has moved from the first element 51, a brewing cycle can be started. One brewing cycle consists of the following operations:
  Vacuum pump switched on: from 0 sec to 19 sec; to draw air from the headspace of the brew chamber and simultaneously pull in air through the opening 55 of the cartridge. During seconds 0-2, the gas flow rate of the pump is about 4.5-5.5 liters per minute; and from 2-19 seconds the gas flow rate is at about 2.5 liters per minute.
  Water pump switched on: from 0.5 sec to 12 sec, to fill the brew chamber with hot water from the boiler, having a temperature of about 85° C.; the maximum water flow rate during filling of brew chamber is about 975 milliliter per minute.
  The brewing of the beverage is being conducted while the vacuum pump is switched on, and air is pulled in through the opening 55 of the first element 51 of the cartridge, consequently leading to the formation of rising gas bubbles that mix the beverage and the tea leaves during the brewing process.
  When switching off the vacuum pump at 19 sec: discharge of brewed beverage from the brew chamber, through opening 55 and opening 73 of the cartridge, into a cup. A valve is opened in a pipe connected to the headspace of the brew chamber, in order to open the brew chamber to the atmosphere, and enable discharge of the brew chamber through opening 55 and opening 73 of the cartridge.

At 23 sec a pulse of hot water is injected during 1 sec, in order to rinse the content of the brew chamber. From 24 to 26 sec the air pump is switched on to blow air into the headspace of the brew chamber and therewith beverage is pushed out of the brew chamber through the filter.

Similarly at 26 sec a second pulse of hot water is injected during 1 sec, in order to rinse the content of the brew chamber. From 27 to 29 sec the air pump is switched on to blow air into the headspace of the brew chamber and therewith beverage is pushed out of the brew chamber through the filter.

Example 2

Comparing Teas Prepared by Method of the Invention

In order to determine whether tea prepared by the apparatus and method according to the present invention are perceived to be of a special quality, the consumer, the following experiment was conducted.

In total 474 consumers were divided in 3 groups (150, 166, and 158 people, respectively), and all were asked to give their opinion on a cup of tea prepared with an apparatus as described in example 1, having a transparent brew chamber, or a regular cup of tea prepared with a regular tea bag.

Group A:
150 consumers were offered a fresh cup of tea, and they were also shown the apparatus as described in example 1 that was used to prepare the fresh cup of tea. These consumers not only enjoyed a cup of tea, they were also offered the experience of how the cup of tea is prepared using the apparatus as described in example 1.

Group B:
166 consumers were offered a similar fresh cup of tea of the same quality as the other 150 consumers in group A, however to them the apparatus that was used to prepare the cup of tea was not shown, hence they did not experience the brewing process.

Group C:
158 consumers were offered a regular cup of tea, prepared using a Twinings tea bag.

The results on a few aspects which are a measure for the perceived specialness and uniqueness of the tea, are indicated in the following table.

TABLE 1

Comparison between three groups of consumers on their opinion on the quality of tea prepared with apparatus of the invention or regular tea; scored on scale 1 to 5, 1 is 'disagree strongly', 5 is 'agree strongly'

| Attribute | Group A: tasted tea & apparatus shown 150 respondents | Group B: tasted tea & apparatus not shown 166 respondents | Group C: regular tea (tea bag) 158 respondents |
|---|---|---|---|
| Is fresh | $3.93^{C*}$ | 3.81 | 3.68 |
| Tastes great | $3.81^C$ | 3.65 | 3.42 |
| Is thirst quenching | 3.70 | 3.66 | 3.59 |
| Is refreshing | 3.83 | 3.73 | 3.68 |
| Is relaxing | $3.61^B$ | 3.39 | 3.46 |
| Is easy to drink | $3.87^{BC}$ | 3.99 | 3.77 |
| Is natural | $3.69^B$ | 3.41 | 3.38 |
| Contains ingredients good for my body | 3.35 | 3.15 | 3.23 |
| Is healthy | 3.41 | 3.33 | 3.24 |
| Is good for me | 3.44 | 3.35 | 3.31 |
| Makes me feel good when I drink it | $3.63^{BC}$ | 3.39 | 3.35 |
| Revitalises my body and mind | $3.43^B$ | 3.19 | 3.24 |
| Changes my mood | $3.31^{BC}$ | 3.07 | 3.06 |
| Makes me feel lively and vital | 3.18 | 3.01 | 3 |
| Is an indulgence, a treat | $3.08^B$ | 2.83 | 2.91 |
| Is a product for me | $3.53^C$ | 3.41 | 3.25 |
| Is good quality | 3.69 | 3.65 | 3.51 |
| Is for everyday | 3.73 | 3.77 | 3.58 |
| Is premium | $3.40^C$ | 3.31 | 3.1 |
| Is made by experts in tea | $3.55^C$ | 3.40 | 3.18 |
| Is an authentic tea | $3.53^C$ | 3.42 | 3.28 |
| Has a rich flavour | $3.68^C$ | 3.48 | 3.36 |

*$^B$ or $^C$ indicates whether the measured difference is statistically significant vs. group B, or group C, respectively, or vs. both groups (95% confidence level)

These results show that consumers especially appreciate the tea prepared with the apparatus of example 1 (groups A and B): on many attributes the score is higher for tea prepared using the method according to the invention than for a regular tea prepared using a regular tea bag (group C). Moreover, consumers in group A score a cup of tea on quite some aspects higher than in group B. Hence these consumers in group A assess the tea to be of a more special quality and uniqueness than the consumers who have tasted tea prepared by the same apparatus and method, but to whom the apparatus is not shown.

These results indicate that the visual appearance of the apparatus, with a transparent brew chamber and demonstrating the way the tea is prepared, provides an attractive experience to the consumer, leading to the impression that the tea is of a more special quality than a regular tea or a similar tea which is prepared without demonstrating the brewing process.

The invention claimed is:

1. A cartridge for connecting to a brew chamber for brewing a beverage, comprising a first element and a second element,
    wherein the first element comprises a side wall and a bottom wall,
    wherein the side wall and bottom wall are made from a water-impermeable material,
    wherein the bottom wall contains a protuberance that directs to the outside of the first element,
    wherein the bottom wall contains an opening,
    wherein the opening comprises a filter which is permeable to water,
    wherein the top is optionally closable by a seal and which is attachable to the upper rim of the side wall,
    and wherein the bottom wall comprises one or more notches directed to the inside of the first element,
    and wherein the second element comprises a bottom wall,
    wherein the bottom wall is made from a water-impermeable material,
    wherein the bottom wall comprises an opening (73) which is able to interlock with protuberance (54) in order to create a water-tight connection,
    wherein the bottom wall contains one or more protuberances,
    and wherein the second element is moveable relative to the first element about the corresponding notch and protuberance.

2. A cartridge according to claim 1, wherein the side wall and bottom wall of the first element comprise polypropylene.

3. A cartridge according to claim 1, wherein the pores of the filter have a size of between 0.1 and 1 millimeter.

4. A cartridge according to claim 1, wherein the cartridge contains an infusible particulate material having a particle size larger than the pore size of the filter.

5. A cartridge according to claim 1, wherein the infusible particulate material comprises at least one of tea leaves or a herbal composition.

6. A method for opening a cartridge according to claim 1, wherein the protuberance of the first element of the cartridge is interconnected with the opening of the second element to close the bottom wall of the first element, wherein the second element is moved from the first element about the corresponding notch and protuberance, to expose the filter to the atmosphere.

7. A method for brewing a beverage in a brewing apparatus using a cartridge according to claim 4,
wherein the apparatus comprises a brew chamber that comprises a side wall, a bottom rim, a top wall, and an opening, and means to connect a cartridge to the brew chamber, comprising the steps:
a) optionally releasing seal from the cartridge,
wherein the protuberance of the first element is interconnected with the opening of the second element to close the bottom wall of the first element;
b) putting the cartridge into the brewing machine and connecting the top rim of the first element of the cartridge to the bottom rim of the brew chamber, such that a watertight connection is made;
c) optionally prior to or simultaneous with step b), moving the second element of the cartridge relative to the first element of the cartridge, such that the filter is exposed to the atmosphere;
d) drawing gas out of the brew chamber through opening or through optional opening, and simultaneously drawing gas into the brew chamber through opening and filter of the cartridge;
e) at least partly simultaneous with step d), filling the brew chamber with water, and brewing the beverage by mixing water and infusible particulate material in the brew chamber; and
f) terminating drawing of gas out of the brew chamber and discharging the brewed beverage through opening.

* * * * *